US007469285B2

(12) United States Patent
Poortman

(10) Patent No.: US 7,469,285 B2
(45) Date of Patent: *Dec. 23, 2008

(54) GENERATION OF COMPUTER RESOURCE UTILIZATION DATA PER COMPUTER APPLICATION

(75) Inventor: Peter M. W. Poortman, Aukland (NZ)

(73) Assignee: Electronic Data Systems Corporation, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/757,209

(22) Filed: Jun. 1, 2007

(65) Prior Publication Data

US 2007/0226389 A1    Sep. 27, 2007

(51) Int. Cl.
G06F 15/173 (2006.01)
G06F 15/177 (2006.01)

(52) U.S. Cl. .................. 709/223; 709/221; 709/224; 709/226

(58) Field of Classification Search ............ 709/221, 709/223, 224, 226
See application file for complete search history.

(56) References Cited

U.S. PATENT DOCUMENTS

| | | | | |
|---|---|---|---|---|
| 5,668,944 | A | * | 9/1997 | Berry |
| 5,696,701 | A | | 12/1997 | Burgess et al. |
| 5,696,710 | A | * | 12/1997 | Hague et al. |
| 5,758,071 | A | * | 5/1998 | Burgess et al. |
| 5,761,091 | A | * | 6/1998 | Agrawal et al. ............ 702/186 |
| 5,796,633 | A | * | 8/1998 | Burgess et al. |
| 5,949,415 | A | * | 9/1999 | Lin et al. |
| 5,958,009 | A | * | 9/1999 | Friedrich et al. ............ 709/224 |
| 5,961,596 | A | * | 10/1999 | Takabu et al. |
| 6,076,105 | A | * | 6/2000 | Wolff et al. |
| 6,128,628 | A | * | 10/2000 | Waclawski et al. ........... 707/203 |
| 6,148,335 | A | | 11/2000 | Haggard et al. |
| 6,192,490 | B1 | * | 2/2001 | Gross |
| 6,230,204 | B1 | * | 5/2001 | Fleming, III ................. 709/229 |
| 6,258,785 | B1 | | 7/2001 | Su et al. |
| 6,269,401 | B1 | | 7/2001 | Fletcher et al. |

(Continued)

FOREIGN PATENT DOCUMENTS

EP    0 940 754    9/1999

(Continued)

OTHER PUBLICATIONS

International Search Report, Application No. PCT/US03/30516, dated Aug. 3, 2005.

(Continued)

*Primary Examiner*—Ario Etienne
*Assistant Examiner*—Sargon N Nano
(74) *Attorney, Agent, or Firm*—Fish & Richardson P.C.

(57) ABSTRACT

Reporting Unix or similar computer resource utilization per computer application includes processing a collector script during first predetermined time intervals. The collector script collects resource utilization data for processes currently running on a computer. The processes correspond to one or more computer applications. A processor script is processed during second predetermined time intervals. The processor script determines resource utilization data for one or more computer applications by performing calculations on the resource utilization data for the processes. Reports of resource utilization data for one or more computer applications are presented by accessing and performing calculations on the resource utilization data for one or more computer applications.

23 Claims, 26 Drawing Sheets

U.S. PATENT DOCUMENTS

| | | | |
|---|---|---|---|
| 6,321,264 | B1 | 11/2001 | Fletcher et al. |
| 6,327,677 | B1 * | 12/2001 | Garg et al. |
| 6,363,477 | B1 | 3/2002 | Fletcher et al. |
| 6,405,327 | B1 * | 6/2002 | Sipple et al. |
| 6,457,142 | B1 * | 9/2002 | Klemon et al. |
| 6,487,578 | B2 * | 11/2002 | Ranganathan ............... 718/104 |
| 6,493,318 | B1 | 12/2002 | Bare |
| 6,516,348 | B1 | 2/2003 | MacFarlane et al. |
| 6,557,035 | B1 * | 4/2003 | McKnight |
| 6,584,501 | B1 * | 6/2003 | Cartsonis et al. ............ 709/224 |
| 6,618,709 | B1 | 9/2003 | Sneeringer |
| 6,651,062 | B2 * | 11/2003 | Ghannam et al. ............ 707/10 |
| 6,665,268 | B1 | 12/2003 | Sato et al. |
| 6,683,856 | B1 | 1/2004 | Brinkman et al. |
| 6,691,067 | B1 * | 2/2004 | Ding et al. .................. 702/186 |
| 6,748,416 | B2 * | 6/2004 | Carpenter et al. ........... 709/202 |
| 6,751,662 | B1 * | 6/2004 | Natarajan et al. ........... 709/223 |
| 6,769,024 | B1 * | 7/2004 | Natarajan et al. ........... 709/224 |
| 6,772,411 | B2 | 8/2004 | Hayes et al. |
| 6,801,940 | B1 | 10/2004 | Moran et al. |
| 6,802,054 | B2 * | 10/2004 | Faraj ........................ 717/128 |
| 6,836,800 | B1 | 12/2004 | Sweet et al. |
| 6,839,070 | B2 * | 1/2005 | Meandzija et al. .......... 715/736 |
| 6,862,623 | B1 * | 3/2005 | Odhner et al. .............. 709/226 |
| 6,985,940 | B1 | 1/2006 | Jenkin |
| 6,990,071 | B2 | 1/2006 | Adam et al. |
| 6,996,517 | B1 | 2/2006 | Papaefstathiou |
| 6,999,961 | B2 * | 2/2006 | Hall ........................ 707/10 |
| 7,028,301 | B2 | 4/2006 | Ding et al. |
| 7,032,063 | B1 | 4/2006 | Kurpanek |
| 7,051,098 | B2 * | 5/2006 | Masters et al. .............. 709/224 |
| 7,093,004 | B2 | 8/2006 | Bernardin et al. |
| 7,099,797 | B1 | 8/2006 | Richard |
| 7,152,105 | B2 | 12/2006 | McClure et al. |
| 7,167,821 | B2 * | 1/2007 | Hardwick et al. ............. 703/22 |
| 7,225,249 | B1 | 5/2007 | Barry et al. |
| 7,272,155 | B2 * | 9/2007 | Kenney et al. .............. 370/469 |
| 7,299,277 | B1 | 11/2007 | Moran et al. |
| 2002/0138559 | A1 | 9/2002 | Ulrich et al. |

FOREIGN PATENT DOCUMENTS

| | | |
|---|---|---|
| WO | 00/19664 | 4/2000 |
| WO | 02/097630 | 12/2002 |
| WO | 03/005279 | 1/2006 |

OTHER PUBLICATIONS

Notification of Transmittal of the International Search Report and the Written Opinion of the International Searching Authority, or the Declaration (2 pages), International Search Report (4 pages); and Written Opinion of the International Searching Authority (5 pages) re International Application No. PCT/US2005/033444 dated Apr. 11, 2006.

Gross, Kenny C. et al., *Proactive Detection of Software Aging Mechanisims in Performance Critical Computers, Proceedings of the 27th Annual NASA Goddard/IEEE Software Engineering Workshop* (SEW-27/02), Dec. 5-6, 2002, Piscataway, NJ, USA, pp. 17-23.

Notification Concerning Transmittal of Copy of International Preliminary Report on Patentability (1 page); International Preliminary Report on Patentability (1 page); Written Opinion on the International Searching Authority (5 pages); all mailed on May 10, 2007 in PCT Application No. PCT/US2005/033444.

*AIX Version 3.2—System Management Guide; Operating System and Devices*, Chapter 14—System Accounting; Oct. 1993, XP002067192, (pp. 14-1-14-29) (29 pages).

* cited by examiner

```
       user        PID     TIME  RSS  COMMAND
       root   506 508 0  510 0:41    0  sched
      daemon         183     0:00 1112  /usr/lib/nfs/statd
501    root          222     2:48 4496  /usr/sbin/nscd       504
                                    512      514
        ...
502    root          202     0:16 1656  /usr/sbin/syslogb
       root          262     0:20 1208  /usr/ilib/inet/xntpd
     unicentr   518 12462 520 0:00 4184  awservices
       root          366     9:35 1952  mibiisa
     cap_resp       10:00,5.36,5,4,5       516
     cap_acc.        534 534         530  522 524 526
     cap_acct        sys 0.04            532
528  cap_acct        root 5.82           534
     cap_acct        adm 6.16            536
```

```
se395,00,22/09/02,v070802,SunOS(sunos),rel
5.7,ps=8288,acctcom=18621,acctbad=553
  Userid,Users,CPU,Mem
 t913846,0,0,208
 oracleEisD,4,2,210324
 nobody,0,0,326
 t911452,0,0,208
 gap,0,1,21992
 oracleAcpsT,0,1,216001
 oracle,0,687,41684
 oracleTrnP,3,0,186569
 (...)~801
 dzpwvj,0,1,1204
 sadaemon,0,0,280      806
 oracleCaseT,3,0,619399
802 (oracleNfwU,3,2,758345)~804
 deamon,0,0,568  808 810 812
 BSS65,0,0,2062
 oracleCssD,4,2,493447
 appserv,0,1347,118916
 BSS66,0,0,2063
 oracle816tse27,3,2,167948
 oracleEisA,5,0,421540
 oraclePrbrD,3,1,3263703
 t914159,0,0,0
 oracleCssX,3,4,594531
 cap_resp,00:30,7.45,3,7,4~816
 cap_resp,00:55,4.86,3,5,3~816
 cap_resp,00:35,5.13,3,5,3~816
 cap_resp,00:00,6.34,4,6,4~816
 cap_resp,00:20,4.70,2,5,2~816
 cap_resp,00:50,7.31,4,6,4~816
 cap_resp,00:45,5.14,3,5,2~816
 cap_resp,00:40,5.89,4,6,3~816
814 cap_resp,00:15,6.82,4,7,2~816
 cap_resp,00:25,5.74,4,5,3~816
 cap_resp,00:05,5.63,2,5,3~816
 cap_resp,00:10,5.50,4,5,3~816
 cap_net,Name  Mtu  Net/Dest        Address         Ipkts       Ierrs Opdts       Oerrs Collis
 Queue
 cap_net,lo0   8232 loopback        localhost       402815799   0     402815799   0
 0      0
 cap_net,qfe0  1400 se395.telecom.co.nz se395.telecom.co.nz 81704080 0
 69079343 0    0    0
818 cap_net,ba0  9180 se395_atm0      se395_atm0      419744188   3     834739771   0
 0      0
 cap_net,lane0 1500 se395_fxlan     se395_fxlan     3516773     0     438706      0    0
 0   ~820  822          824                                    826
 cap_net,qfe1  1500 se395_tpm       se395_tpm       80906       0     2431        0    0
 0
```

800

1102  1104 1106  1108                                    1100

(SunOS se395 5.7 Generic_106541-21 sun4u)   09/22/02

```
        00:00:00   %usr    %sys    %wic    %idle
        00:10:00    22      11      30      36
        00:20:00    23      12      42      23
        00:30:00    25      12      36      27
1110   (...)—1101
        23:40:00    14       8       2      76
        23:50:00    13       7       2      78

Average     22       9      13      55

00:00:00  runq-sz %runocc swpq-sz %swpocc
        00:10:00    2.0     26     0.0       0
        00:20:00    2.3     33     0.0       0
        00:30:00    2.2     35     0.0       0
        00:40:00    1.8     30     0.0       0
1112   (...)—1101
        23:40:00    1.4     20     0.0       0
        23:50:00    2.0     20     0.0       0

Average     1.9     30     0.0       0

00:00:00 swpin/s bswin/s swpot/s bswot/s pswch/s
        00:10:00   0.00    0.0    0.00    0.0    4036
        00:20:00   0.00    0.0    0.00    0.0    4009
        00:30:00   0.00    0.0    0.00    0.0    4481
1114   (...)—1101
        23:50:00   0.00    0.0    0.00    0.0    1889

Average    0.00    0.0    0.00    0.0    2688
```

FIG. 11

(4 Processors) ~1202                                                                          1200

```
     CPU minf mjf xcal  intr ithr  csw icsw migr smtx srw sysol usr sys wt idl
       8  162   1  378   318  266  534  208  121  549   2   568  19  12 32  36
1204   9  218   1   62   644  400  552   75   82   29   2   552  35  13 20  32
      10  215   2  648   174  100  698   86   97   26   2   609  31  14 26  30
      11  223   2  658   187  114  675   88   94   25   2   640  32  14 24  30
```
System Configuration: Sun Microsystems sun4u SUNW,Ultra-Enterprise-10000
System clock frequency: 100 MHz
Memory size: 4096 Megabytes

```
========================= CPUs =========================
                  Run   Ecache  CPU   CPU
Brd  CPU  Module  MHz   MB      Impl. Mask
---  ---  ------  ----  ------  ----- ----
 2    8    0      400    8.0    US-II 10.0
 2    9    1      400    8.0    US-II 10.0
 2   10    2      400    8.0    US-II 10.0
 2   11    3      400    8.0    US-II 10.0
```
⎬ 1210

```
========================= MEMORY =========================
         Memory Units: Size
           0: MB   1: MB   2: MB   3: MB
         ------  ------  ------  ------
Board 2    1024    1024    1024    1024
```
⎬ 1212

1206

```
========================= I/O Cards =========================
     Bus   Freq
Brd  Type  MHz   Slot  Name                   Model
---  ----  ----  ----  ---------------------  ---------------
 2   SBus   25    0    fcaw/sd (block)        FCW
 2   SBus   25    0    SUNW,ba                SUNW,SAHI-3
 2   SBus   25    1    QLGC,isp/sd (block)    QLGC,ISP1000
 2   SBus   25    1    SUNW,qfe               SUNW,sbus-qfe
 2   SBus   25    1    SUNW,qfe               SUNW,sbus-qfe
 2   SBus   25    1    SUNW,qfe               SUNW,sbus-qfe
 2   SBus   25    1    SUNW,qfe               SUNW,sbus-qfe
```
⎬ 1214

```
For diagnostic information,
see /var/opt/SUNWssp/adm/se395/messages on the SSP.
Filesystem           kbytes      used     avail capacity  Mounted on
/proc                     0         0         0    0%     /proc
/dev/md/dsk/d0      3009594   1848159   1101244   63%     /
fd                        0         0         0    0%     /dev/fd
/dev/md/dsk/d20     1986439    851249   1075597   45%     /var
(...) ~1201
/dev/md/dsk/d120   34785811  11197182  23240771   33%     /sdball
/dev/md/dsk/d115    8695972   4180304   4428709   49%     /appl/ofpoc
se395 disk totals: 16.6129 GB local, 463.567 GB EMC
```
⎬ 1208

```
if [ "$type" = "full" ]; then
        $upc/bin/chkfiles
        usrind=no
    if [ -f ./daily/usr_$d ]; then
        if [ `cat ./daily/usr_$d |grep -v "_" |wc -l |nawk '{print $1};'` -gt 0 ];
then
                usrind=yes
                if [ ! -f $upc/$reg/$cust/ut_$machine ]; then echo
"Systemid,Userid,Applid" > $upc/$reg/$cust/ut_$machine ; fi
            $upc/bin/merge $reg $cust $machine $d >> $upc/
$reg/warn.log 2>> $upc/$reg/merge.err
            $upc/bin/rtproc $reg $cust $machine $d $mm $y $m
2>> $upc/$reg/rtproc.err
                $upc/bin/net $os $d 2>> $upc/$reg/net.err if [ "$os" = "AIX" ]; then
                        echo "Time,$d/$mm/$y,`cat mem`" > ./
$m$y/smd${d}.csv
                        grep "cap_mem" ./daily/usr_$d | sort -t,
-k2 | cut -d, -f2,3 >> ./$m$y/smd${d}.csv
                $upc/bin/tally_r < ./$m$y/smd${d}.csv >>
smm${mm}.csv
                fi $upc/bin/clean acd${d}.csv
            $upc/bin/clean atd${d}.csv
            $upc/bin/clean amd${d}.csv
            $upc/bin/clean2 $mm $upc/bin/tally_a < acd${d}.csv >> acm${mm}.csv
                $upc/bin/tally_a < atd${d}.csv >> atm${mm}.csv
            $upc/bin/tally_a < amd${d}.csv >> amm${mm}.csv mv ??d${d}.csv ./$m$y $upc/bin/appsum acm${mm}.csv tcm${mm}.csv
            $upc/bin/appsum atm${mm}.csv ttm${mm}.csv
            $upc/bin/appsum amm${mm}.csv tmm${mm}.csv
    fi
    fi
    if [ "$usrind" = "no" ]; then
                echo "$cust/$machine - usr_$d not found." >>
$upc/$reg/warn.log
                echo "$d/$mm/$y,TOTAL" >> atm${mm}.csv
                echo "$d/$mm/$y,TOTAL" >> acm${mm}.csv
                echo "$d/$mm/$y,TOTAL" >> amm${mm}.csv
                echo "$d/$mm/$y" >> rtm${mm}.csv
                echo "Time,$d/$mm/$y" >> ./$m$y/rtd${d}.csv
                if [ "$os" = "AIX" ]; then echo "$d/$mm/$y" >>
smm${mm}.csv ; fi
        fi
fi
```

FIG. 15

SE395 - State Of Health - Aug/2002

| CPU CAPACITY: | WARNING |
|---|---|
| MEMORY CAPACITY: | OK |
| FILESYSTEM CAPACITY: | OK |
| DISK I/O: | WARNING |

CONFIGURATION: SUN MICROSYSYEMS SUN4U SUNW ULTRA-ENTERPRISE-10000
SUNOS 5.7
4 PROCESSORS (1600 MHz)
4096 MB PHYSICAL MEMORY

| RED FLAGS | COUNT/10 | MEASURE | THRESHOLD |
|---|---|---|---|
| CPU UTILISATION | 3 | 100 | 80 % |
| CPU WAIT I/O | 1 | 42 | 30 % |
| PROCESS SWITCHING | 2 | 6722 | 5500 /SEC |
| RUN QUEUE SIZE | 3 | 42 | 6 |

FIG. 24

GENERATION OF COMPUTER RESOURCE UTILIZATION DATA PER COMPUTER APPLICATION

TECHNICAL FIELD

This disclosure relates to the generation of computer resource usage information.

BACKGROUND

Computer hardware resource usage information may include, for example, the processing capacity and memory capacity currently and historically used on each computer of a computer system. This information may be useful to computer system managers.

SUMMARY

In one general aspect, reporting computer resource utilization per computer application includes processing a collector script during first predetermined time intervals. The collector script collects resource utilization data for processes currently running on a computer. The processes correspond to one or more computer applications. A processor script is processed during second predetermined time intervals. The processor script determines resource utilization data for one or more computer applications by performing calculations on the resource utilization data for the processes. Reports of resource utilization data for one or more computer applications are presented by accessing and performing calculations on the resource utilization data for one or more computer applications.

Implementations may include one or more of the following features. For example, the computer applications may be unix-based computer applications. A transfer script may also be processed during third predetermined time intervals. The transfer script may send the resource utilization data for one or more computers to a central server as an ASCII file in an e-mail message. Presenting reports may include accessing resource utilization data stored in the central server.

The first predetermined time intervals may be shorter than the second predetermined time intervals, which may be shorter than the third predetermined time intervals. For example, the second time intervals may be integer multiples of the first time intervals and the third time intervals may be integer multiples of the second time intervals.

The resource utilization data of processes may include central processing unit utilization data and memory utilization data for each process. The resource utilization data of processes and the resource utilization data of one or more applications may be stored in ASCII files.

The collector script may also collect computer response time data. The computer response time data may be collected by the collector script by invoking a response time script that calculates the amount of time required to execute a predetermined code segment.

Managers may use computer hardware resource utilization data, including computer response time and computer resource utilization data per computer application, to detect and address ahead of time any computer performance problems that may arise due to resource constraints. Without such resource usage information, managers are typically forced to wait until users complain or processing backlogs occur before these problems are brought to their attention.

Managers may also use such information to proactively plan capacity upgrades. Capacity trends derived from current and historical hardware resource usage data may be used to predict whether, when, and how much hardware should be purchased in the future. Given the several month lead-time frequently required for purchase and installation of hardware, this ability to plan capacity upgrades and hardware purchases ahead of time is particularly useful.

Resource utilization data per computer application may be used by managers to predict the amount of computing resources required when introducing a new application. Managers lacking this information frequently waste money by conservatively overestimating the resource requirements of the application and purchasing more resources than required. Such resource usage per application data also may be used by managers to bill customers for computer usage.

Other features will be apparent from the following description, including the drawings, and the claims.

DESCRIPTION OF DRAWINGS

FIG. 5 shows an example of the contents of a collector file resulting from processing the collector script of FIG. 3.

FIG. 7 shows exemplary UNIX code segments that may be used to perform the operations in the process in FIG. 6.

FIG. 8 shows an example of the contents of a user file resulting from processing the processor script of FIG. 6.

FIGS. 11 and 12 show an example of the contents of a miscellaneous file resulting from processing the transfer script of FIG. 9.

FIGS. 14 and 15 show exemplary UNIX code segments that may be used to perform the operations in the process in FIG. 13.

FIG. 24 is a computer health report.

Like reference symbols in the various drawings indicate like elements.

DETAILED DESCRIPTION

Figure 1:
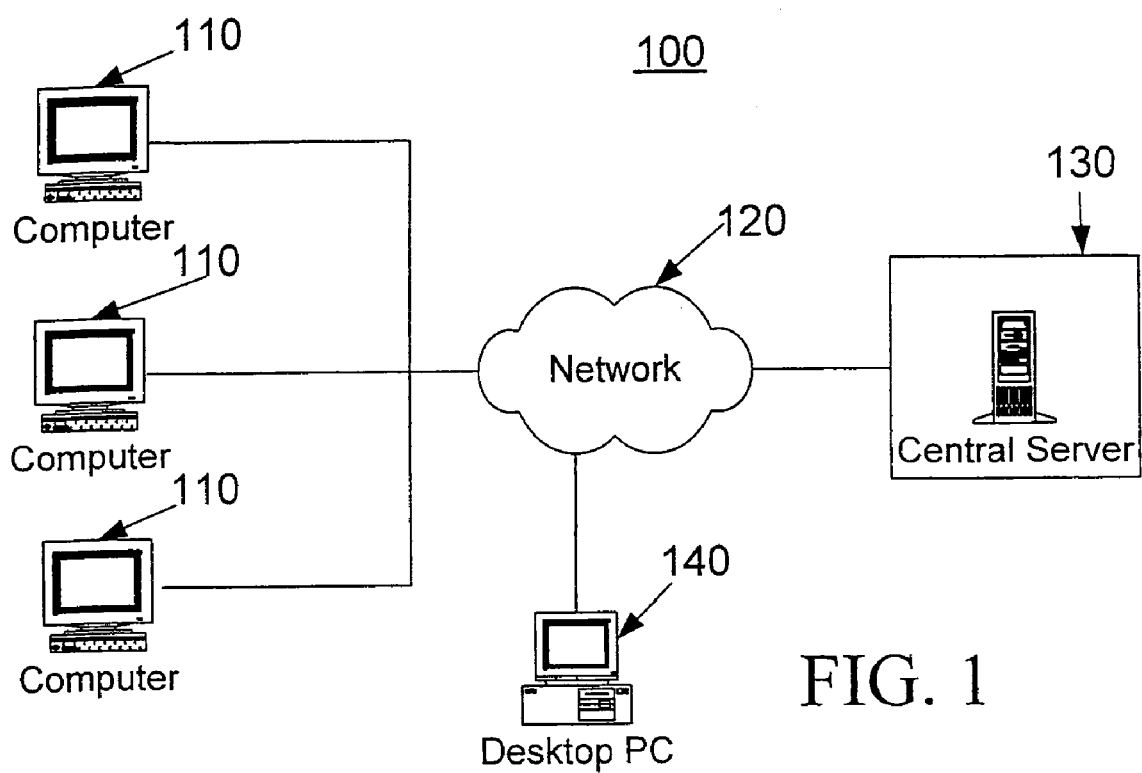
FIG. 1 is a block diagram of a computer system that is able to generate reports of computer resource use per computer application.

Referring to FIG. 1, a computer system 100 that is able to generate reports of computer resource use per computer application includes Unix or similar computers 110 connected through a network 120 to a central Unix or similar server 130. A desktop computer 140 is also connected to the network 120.

Each computer 110 may be any computing platform that is able to run scripts (i.e., lists of computer commands that may be executed without user interaction) and generate and send American Standard Code for Information Interchange (ASCII) files. Each computer 110 processes scripts that generate computer resource utilization data files for that computer. These data files may be ASCII files and may be periodically sent to the central server 130 for processing. Versions of UNIX may include those provided by Sun (SunOS), IBM Advanced Interactive Executive (AIX), Hewlett Packard (HP-UX), Compaq (OSF1), and Silicon Graphics (IRIX). The resource utilization data files may be, for example, comma separated variable (csv) text files.

The network 120 allows the computers 110 and the desktop computer 140 to communicate with the central server 130. The network 120 may be the Internet, a local area network (LAN), or a wide area network (WAN). The computers 110, the central server 130, and the desktop computer 140 may send ASCII files to one another using the network 120 and any network communications protocol capable of file transfer. Examples of network communications protocols capable of file transfer include file transfer protocol (ftp) and simple mail transfer protocol (SMTP). For UNIX-based computers, RSHELL may be used to output the data directly.

The central server 130 may be any computing platform able to generate, send, and receive ASCII files and run scripts. The central server 130 may be a separate standalone unit as shown in FIG. 1 or may be one of the computers 110. The central server 130 periodically receives computer resource utilization data files from each computer 110 and processes the computer resource utilization data files to create report data files as ASCII files. The central server 130 stores the report data files, and these are subsequently accessed by the desktop computer 140 via, for example, Network File Sharing connectivity. In one implementation, the central server 130 is a platform that runs a version of UNIX, and the report data files are csv text files.

The desktop computer 140 may be any computer that is able to request and receive ASCII files from the central server 130 and to run a report production application capable of generating computer resource utilization reports based on the received report data files. The desktop computer 140 may be local or remote to the central server or to one or more of the computers 110. In one implementation, the desktop computer 140 is a personal computer that runs a desktop publishing software program that includes report templates. The report data files are copied directly into the data sheets of the report templates, and the reports are subsequently generated through the use of macros. The desktop publishing software may be, for example, Microsoft Excel.

Figure 2:
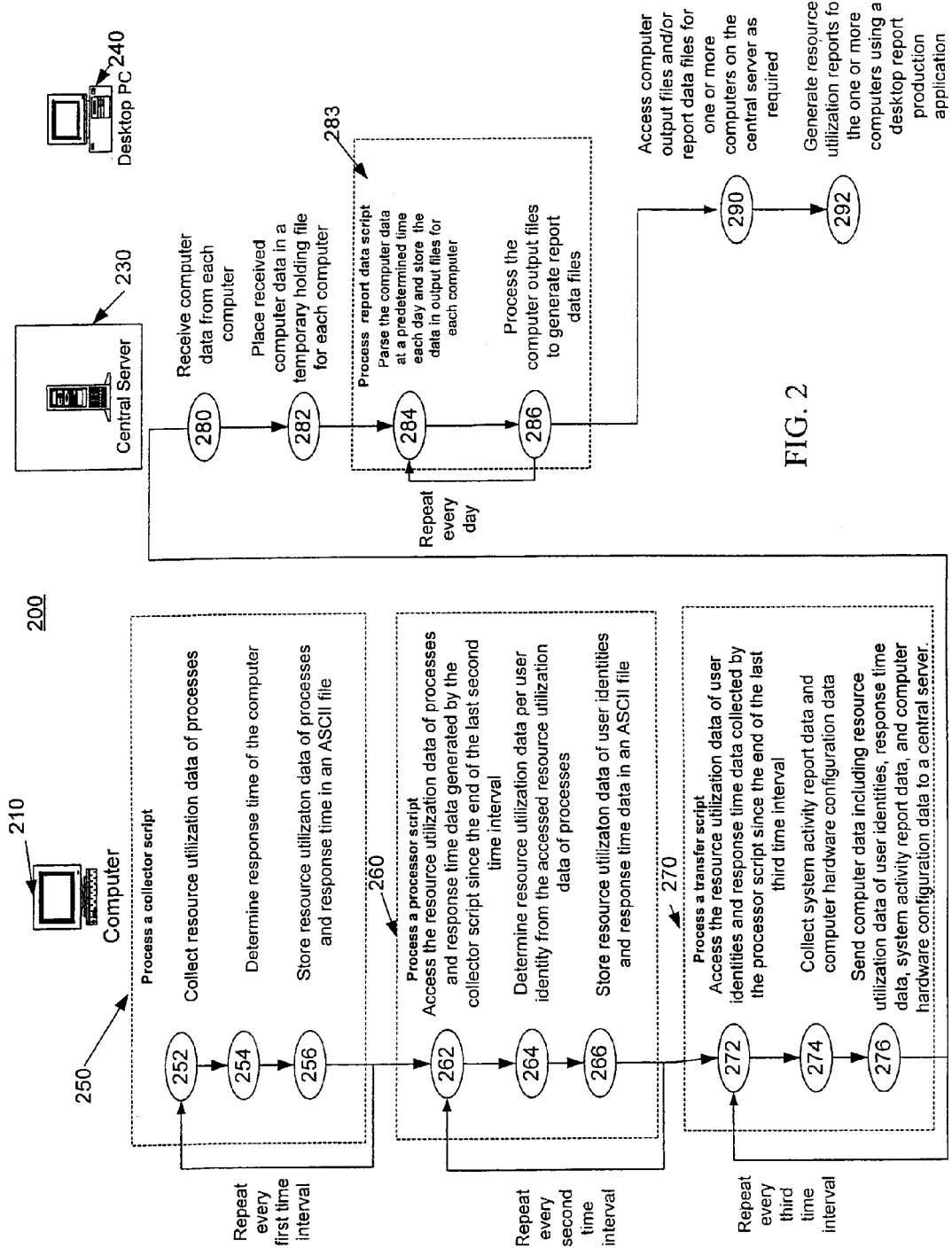
FIG. 2 is a flow diagram of a process for generating resource utilization reports for computers.

Referring to FIG. 2, a process 200 for generating resource utilization reports for computers 110 is carried out by one or more computers 110, the central server 130, and the desktop computer 140. The process 200 includes having a computer 110 repeatedly process a collector script at the end of first time intervals (250), repeatedly process a processor script at the end of second time intervals (260), and repeatedly process a transfer script at the end of third time intervals (270). In some implementations, the first time interval is shorter in duration than the second time interval which, in turn, is shorter in duration than the third time interval. In one particular implementation, the second time interval has a duration of "n" first time intervals, where "n" is an integer greater than one. Similarly, the third time interval has a duration of "m" second time intervals, where "m" is an integer greater than one. The time granularity of some of the data collected is determined by the duration of the time intervals.

Processing the collector script (250) includes processing a script that collects resource utilization data of processes (i.e., resource utilization data of executing programs) (252), determines the response time of the computer (254), and stores the resource utilization data and computer response time data in an ASCII file (256).

The processes for which resource utilization data is collected (252) may include processes that are currently active and processes that are defined as transient. Processes that are currently active are programs that are currently being executed by the computer at the time the collector script is run. Processes that are transient are processes that are not being executed by the computer when the collector script is run but were executed completely (i.e., execution began and ended) within the last first time interval. In some implementations, transient processes may be defined more broadly as processes that began within the last two first time intervals and ended within the last first time interval.

Resource utilization data of processes may include data entries containing a user identity for the process, a command instruction, a process identity, the amount of central processing unit (CPU) processing time that the process has used to date, and the amount of memory the process is currently holding. The user identity is a label for the entity that originally launched the process. The entity may be a person, an application, or the computer itself. An application is a program or group of programs designed for end users. The command instruction is the instruction used by the entity to launch the process. The process identity is typically a number that identifies a specific process. The CPU processing time may be expressed in CPU seconds, and the amount of memory held by the process may be expressed in Kbytes.

The response time of the computer may be determined (254) by executing a standard set of commands on the computer 110 and timing how long it takes to run these commands. This set of commands simulates the load imposed by a typical application transaction. The set of commands may be divided into subsets of commands that are tailored towards exercising different resources of the computer. For example, one subset of commands may exercise the CPU resources of the computer. A computer with an overloaded CPU will take longer to process the transaction. Similarly, another subset of commands may exercise the memory resources of the computer. A computer that is memory constrained will take longer to process the transaction. Another subset of commands may be used to estimate how slow or fast the computer is able to read and write data (i.e., the speed of file system usage). These subsets of commands are typically executed thousands of times in order to get an appreciable response time value (e.g., a value in seconds).

Computer response time is a relative estimate that may be used to get an indication of how overloaded the computer 110 is when the collector script is executed. The response time is typically not used directly but rather is compared to previous response times of the computer or to response times of other computers.

The computer response time and the resource utilization data of processes are stored in an ASCII file (256). In one implementation, one ASCII data file is maintained for all of the data collected by the collector script in one second time interval. If the collector script runs n amount of times every second time interval, then the data file will include n sets of data, with each set appended one after the other. Alternatively, each set of data may be placed in its own file. Furthermore, resource utilization data of processes and computer response time data may be stored in separate files.

Processing the processor script (260) includes processing a script that accesses the resource utilization data of processes and the response time data generated by the collector script since the end of the last second time interval (262), determines the resource utilization data per user identity from the accessed resource utilization data of processes (264), and stores the resource utilization data of user identities and response time data in an ASCII file (266).

Accessing the resource utilization data and the response time data (262) includes accessing the one or more ASCII files containing data generated by the collector script since the processor script was last executed. The processor script is therefore able to access multiple sets of data collected at the end of each first time interval. The number of sets collected is, therefore, equal to the number of times that the duration of a first time interval fits within the duration of a second time interval. For example, if the first time interval is five minutes and the second time interval is one hour, twelve sets of data are collected, and all twelve sets are accessed by the processor script. In some implementations, however, processor script calculations may require access to an extra set of data from the last first time interval in the previous second time interval.

The processor script processes the process resource utilization data into resource utilization data per user identity (264) by parsing the data sets by user identity to obtain subsets of process resource utilization data with the same user identity and performing calculations on the resulting subsets. The resource utilization data per user identity may include an estimate of CPU use, an estimate of memory use, and an estimate of the number of active database sessions that occurred in the second time interval.

An estimate of CPU use per user identity may be calculated, for example, by determining the total amount of CPU seconds used by all of the processes launched by that user identity in the second time interval. This calculation requires determining the total CPU time used by each process in the second time interval and then adding up these total CPU times for the processes that were launched by the same user identity. For example, if user identity "unicentr" launched processes 123, 254, and 9, and processes 123, 254, and 9 used, respectively, 1100, 23, and 400 CPU seconds in the second time interval, then the total CPU time used by user identity "unicentr" in the second time interval is 1523 (1100+23+400) CPU seconds.

The total CPU time used by each process in the second time interval may be calculated from the CPU data entries collected by the collector script for that process. For example, if the CPU data entries collected by the collector script for that process correspond to the amount of processing time that the process has used to date, the total CPU time used by each process in the second time interval may be calculated by subtracting the lowest CPU data entry collected for that process in the second time interval from the highest CPU data entry collected for that process in the second time interval. To illustrate, if the highest CPU data entry collected for process 123 is 1230 (i.e., total CPU seconds used to date by process 123 is 1230 seconds) and the lowest CPU data entry collected for process 123 is 220, then the total CPU time used by process 123 over the last second time interval is 1010 (1230-220) CPU seconds.

An estimate of memory use per user identity may also be calculated by, for example, calculating the total amount of memory held by the user identity at the end of each first time interval and averaging this total over the number of first time intervals in a second time interval. The total amount of memory held by the user identity at the end of each first time interval is obtained by adding up the amount of memory held for each process launched by the user identity and for which memory data was collected by the collector script. For example, if the first time interval is twenty minutes and the second time interval is one hour, then three sets of data are collected by the collector script. If user identity "fas" has launched three processes with process identities 5, 123, and 253, and the collected memory data for each process is that shown in Table 1, the total memory held by user identity "fas" is 33+90+27=150 Kbytes at time 20, 60+60+0=120 Kbytes at time 40, and 0+150+0=150 Kbytes at time 60. The average memory held by the user identity "fas" over the last hour (i.e., second time interval) may then be calculated as (150+120+150)/3=140 Kbytes.

TABLE 1

| Process ID: | Time | Amt of Memory Held |
|---|---|---|
| 5 | 20 | 33 Kbytes |
|  | 40 | 60 Kbytes |
|  | 60 | 0 |
| 123 | 20 | 90 Kbytes |
|  | 40 | 60 Kbytes |
|  | 60 | 150 Kbytes |
| 253 | 20 | 27 Kbytes |
|  | 40 | 0 Kbytes |
|  | 60 | 0 Kbytes |

An estimate of the number of active database sessions that occurred in the second time interval on a given database may be determined, for example, by examining the command instruction data entry collected for each process launched by that database (i.e., for each process that has a user identity corresponding to that database). The collected command instructions for each process may be analyzed to see whether they contain keywords that suggest that the process corresponds to an active session. The number of different processes that are active for at least some portion of the second time interval and that are identified as corresponding to an active session are then counted to determine a total number of active database sessions for the second time interval.

Once the resource utilization data per user identity is determined, the data may be stored in an ASCII file (266). The response time data may be aggregated and appended to the end of the ASCII file, or alternatively, may be aggregated and stored in a separate file.

Processing the transfer script (270) includes processing a script that accesses the resource utilization data of user identities and response time data collected by the processor script since the end of the last third time interval (272), collects system activity report data and computer hardware configuration data (274), and sends computer data to the central server (276). The computer data includes the resource utilization data of user identities, the response time data, the system activity report data, and the computer hardware configuration data.

Accessing the resource utilization data of user identities and response time data (272) includes accessing the one or more ASCII files generated by the processor script since the transfer script was last executed. The transfer script is therefore able to access multiple sets of collected data, with each set having been collected by the processor script at the end of a second time interval. The number of data sets collected is, therefore, equal to the number of times that the duration of a second time interval fits within the duration of a third time interval. For example, if the second time interval is one hour and the third time interval is one day, twenty-four sets of data are collected, and all twenty-four sets are accessed by the transfer script.

The system activity report data collected by the transfer script (274) includes general computer level resource utilization data. The computer 110 may be instructed to measure and store this data at regular intervals (e.g., every 10 minutes) in an appropriate file. The transfer script may then access the file and collect all or some of the data as desired. Most computers are able to provide a vast number of different types of computer level resource utilization data.

Some types of computer level resource utilization data, however, are particularly useful in estimating the load on the computer. For example, CPU utilization (i.e., percent of total CPU seconds being used by active processes on the computer) may be examined as an indicator of the overall CPU load of the applications currently running on the computer. The amount of memory that is being swapped in and out from storage may be examined as an indicator of whether the computer is memory constrained. A computer that has insufficient memory is forced to increase its rate of swapping. The number of processes in a process queue that are waiting to be executed may be used as a measure of how overloaded the computer is in general. The transfer script, therefore, may collect all computer level resource utilization data available or, alternatively, may collect only the types of computer level resource utilization data that are useful in estimating the load on the computer.

The computer hardware configuration data collected by the transfer script (274) may include CPU-related hardware data (e.g., number of CPUs, clock frequency, or cache size), memory-related hardware data (e.g., physical memory installed), and input/output (I/O) card-related data (e.g., I/O boards, bus type, slot, or model). The transfer script may also collect processor usage statistics and file system usage data.

The computer data is then sent in one or more files to the central server (276). As a result, the central server 130 receives a new computer data set from each computer 110 at the end of every third time interval (280).

Upon receiving the computer data from a computer 110 (280), the central server 130 places the computer data in a temporary holding file for each computer (282). The central server typically receives computer data from a large number of computers over the course of a day.

The central server 130 processes a report data script (283) at a designated time each day. Processing the report data script includes processing a script that parses the computer data and stores the data in output files for each computer (284), and processes the computer output files to generate report data files (286). The central server 130 may aggregate computers 110 into clusters based on, for example, the geographic region in which the computers 110 are located. The report data script may then be processed multiple times and at different times each day. For example, the report data script may be processed one time for each cluster.

Parsing the computer data (284) includes extracting the computer data from the temporary holding file, separating the data into different portions, and storing each portion in a different output file. The purpose of the separation and storage of the data in different output files is to facilitate the subsequent processing of the data into report data files. In one implementation, the resource utilization data per user identity and the computer response time data are separated and stored in one file and the system activity report data and the computer hardware configuration data are separated and stored in another output file.

The computer output files are processed to generate report data files (286) that may be sent to the desktop computer 140. The processing of the computer output files typically includes parsing the data (e.g., parse by application, by day, by month, by hour) and performing various standard statistical processes on the data (e.g., obtain peak values, average values, moving averages, and minimum values).

The output files may be processed to generate report data files that serve specific purposes. For example, reports that show resource utilization data per application per computer are particularly useful for determining how best to allocate applications among different computers in order to prevent computer overloads. These reports may also be used for billing purposes to allocate application costs to customers. Generation of the report data for these reports requires processing the resource utilization data per user identity stored in the output files into resource utilization data per application. This processing involves mapping one or more user identities to each application.

The mapping of user identities to applications may be accomplished manually or automatically. For manual mapping, a computer administrator identifies the user identities that correspond to a specific application by identifying the user identities employed by users of the application, the user identities employed by other applications that use the application, and/or the user identities employed by the application itself. The identified user identities are then manually mapped to the application by, for example, filling in entries in a table. The corresponding resource utilization data per user identity may be aggregated to obtain resource utilization data for the application.

For automatic mapping, user identities that use a significant amount of the computer's capacity (e.g., CPU capacity) may be mapped to an application with the same name as the user identity. User identities that do not use a significant amount of the computer's capacity may be mapped to an application called "other." For example, if "oracle" is a user identity that has used 12% of the total CPU seconds of the computer in a given time interval and 10% or more is considered to be a significant amount of the computer's CPU processing capacity, then the user identity "oracle" is automatically mapped to a newly created application named "oracle." On the other hand, if the user identity "oracle" has only used 5% of the total CPU seconds of the computer in a given time interval, then the user identity "oracle" is automatically mapped to the application named "other." In this way, user identities that require significant amounts of processing are associated with an application of the same name while user identities that do not require a lot of processing are lumped into an application named "other." The mapping of user identities to applications is typically accomplished by using a combination of both manual and automatic mapping.

Reports that show future resource utilization forecasts per computer are also useful in estimating future resource capacity demands. Computer purchases and upgrades may be planned ahead of time by examining such reports. Standard forecasting techniques may be applied to the computer data to generate report data that estimates future resource utilization for each computer.

Computer health reports that inform computer resource personnel when and whether a given computer is overloaded, underused or currently experiencing problems are also useful for diagnostic purposes. These reports may be generated by processing the data in the output files to create report data files that include red flags. The red flags are generated based on values of selected parameters in the computer data in accordance with a predetermined condition. For example, a red flag may be generated if certain resource utilization parameters are determined to be above or below a predetermined threshold (e.g., CPU use greater than 80%).

Computer hardware configuration reports are also useful in informing computer resource personnel when and how a given computer's hardware has changed over time (e.g., upgrades of CPU, memory, disk). The hardware configuration data in the output files may be processed to identify hardware changes including the time of the change and the type of change that occurred.

The central server 130 stores all the report data files and/or the computer output files for one or more computers, and these will be accessed later by the desktop computer 140 for report production. The desktop computer accesses the computer output files and/or the report data files for one or more computers from the central server (290) via, for example, Network File Sharing connectivity. The desktop computer then is able to generate resource utilization reports for the one or more computers using a desktop report production application.

The desktop computer 140 may further process both the computer data files and the report data files prior to generating the resource utilization reports. The report data files, the computer data files, or the further processed files may be accessed by the desktop report production application to generate reports. For example, the data files may be directly inserted in the data sheets of a report template and the report may be automatically generated using macros.

In one implementation, UNIX servers may be used as computers 110 and central server 130 and a personal computer may be used as the desktop computer 140. The UNIX servers may be programmed to run a collector script at the end of every five minutes (i.e., the first time interval is five minutes), a processor script at the end of every hour (i.e., the second time interval is one hour), and a transfer script at the end of every day (i.e., the third time interval is one day). The UNIX servers may be programmed to run the scripts automatically at these times by adding entries to the chronology tables (crontabs) of the servers. For example, the "sys crontab" may include an entry that causes system activity report data to be generated and stored every ten minutes. The "adm crontab" may include an entry that invokes process accounting one minute past midnight. Process accounting is a UNIX feature that provides process statistics and may be used to estimate the amount of CPU time used by transient processes. The "adm crontab" may include entries that invoke the collector script every five minutes starting on the hour, the processor script every hour starting at minute 57 of the hour, and the transfer script every day starting at one minute before midnight.

Thus, in a given day, the collector script is executed at 00:00, 00:05, 00:10, . . . , 23:50, and 23:55. The processor script is executed at 00:57, 01:57, 02:57, . . . , 22:57, and 23:57. And the transfer script is executed and sends data to the central server at 23:59.

Figure 3:
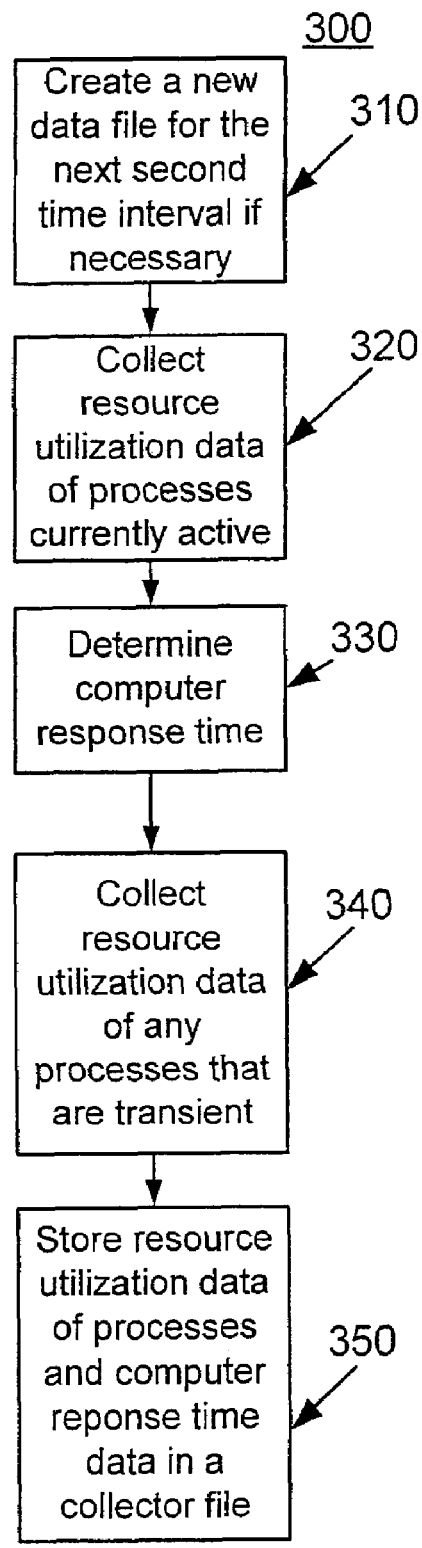
FIG. 3 is a flow diagram of a process implemented by processing a collector script.

Referring to FIG. 3, a process 300 implemented by processing the collector script includes initiating a new data file for the next second time interval if necessary (310), collecting resource utilization data of processes currently active (320), determining the computer response time (330), collecting resource utilization data of any processes that are transient (340), and storing the resource utilization data of processes and computer response time in a collector file (350).

Figure 4:
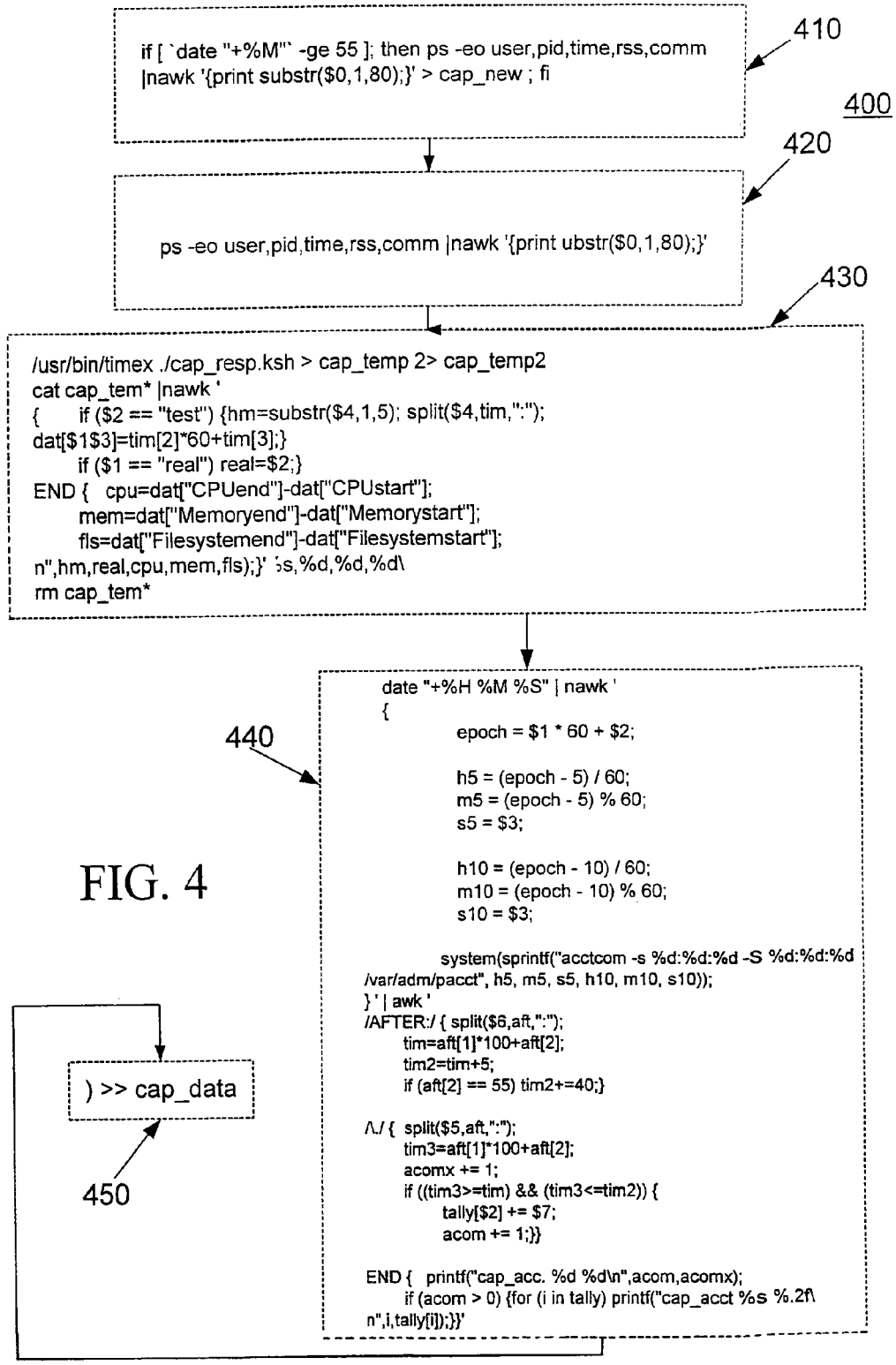
FIG. 4 shows exemplary UNIX code segments that may be used to perform the operations in the process in FIG. 3.

FIG. 4 shows corresponding Sun UNIX code segments 400 used to perform each operation in the process 300. Code segments 410, 420, 430, 440, and 450 correspond to operations 310, 320, 330, 340, and 350, respectively.

FIG. 5 shows contents 500 of the collector file resulting from processing the collector script one time. The ellipses 501 are used to indicate that process entries have been omitted to decrease the size of the contents of the file for illustrative purposes.

A new data file called "cap_new" is created if the collector script is being executed at time xx:55, where xx is any hour of the day (310, 410). When the collector script is executed at any other time (i.e., times xx:00, xx:05, . . . , xx50), no new data file is created. The new data file stores the resource utilization data of processes currently active for the time xx:55. This operation is necessary to provide "start of interval" data for the processor script (i.e., each 5 min interval needs a start as well as an end snapshot in order to calculate the change during that interval, as discussed below).

Resource utilization data of processes currently active is collected by using the UNIX "ps" command (320, 420). A list 502 of resource utilization data of processes is shown in FIG. 5. An exemplary process entry 504 includes a user identity 506, a process identity 508, the amount of CPU processing time that the process has used to date 510, the amount of memory the process is currently holding 512 (i.e., resident set size expressed in Kbytes), and a command instruction 514. According to entry 504, process "222" was launched by the user identity "root", has used two minutes and 48 seconds of CPU time, currently holds 4496 Kbytes, and was launched using the command "/usr/sbin/nscd."

The computer response time is determined by invoking another script named "cap_resp" (330, 430). The "cap_resp" script is included in Appendix A. The script executes three sets of commands. One of the sets of commands provides an estimate of the CPU response time; another set of commands provides an estimate of the memory response time; and the third set of commands provides an estimate of the disk I/O response time. The response time data 516 is shown in FIG. 5. The response time data 516 includes the time at which the response time was measured 518 (e.g., 10:00), the duration of the response time test in seconds 520 (e.g., 5.36 seconds), the duration of the CPU test in seconds 522 (e.g., 5 seconds), the duration of the memory test in seconds 524 (e.g., 4 seconds), and the duration of the disk I/O test in seconds 526 (e.g., 5 seconds).

The resource utilization data of transient processes is collected by accessing process accounting data (340, 440). In this implementation, transient processes are defined as processes that started within the last ten minutes (i.e., within the last two first time intervals) and ended within the last five minutes (i.e., within the last first time interval). A process that began and ended within the last five minutes is transient and does not appear in active process list 502 collected by the collector script. A process that began between five and ten minutes before the collector script is executed (i.e., began within the last two first time intervals but not within the last first time interval) and, therefore, appeared in the process list 502 of the previous collector script data set and ended in the last five minutes is also defined as transient. This process is considered transient despite its appearance in a single active process list 502 because "single appearance" processes cannot be used by the processor script which requires both a "start of interval" and an "end of interval" snapshot.

A list 528 of resource utilization data of transient processes is shown in FIG. 5. The list 528 includes an entry 530 containing the total number of processes that were received by from process accounting in the last ten minutes and, of that number, the number of processes that were valid (e.g., had valid time entries). In the last ten minutes, process accounting detected "534" processes that began within the last ten minutes and ended within the last five minutes. All "534" processes were valid. The list 528 also includes entries 532, 534, and 536 that contain the process accounting estimates of the number of CPU seconds consumed by all transient processes launched by the user identities "sys" (e.g., 0.04 seconds), "root" (5.82 seconds), and "adm" (6.16 seconds), respectively. While the list 528 in the illustrated example only contains entries for these three user identities, the list 528 will generally contain a different data entry for every user identity that launched transient processes.

The resource utilization data of processes and computer response time data is stored in the collector file named "cap_data" (350, 450). In this implementation, every time the collector script is run within a given hour (time xx:00 to xx:55), a resource utilization data list of active processes 502, a computer response time entry 516, and a resource utilization data list of transient processes 528 are appended to the contents of the collector file. The collector file, however, is not empty at time xx:00. Rather, as discussed next, the process script, which erases the collector file every hour, converts the "cap_new" file generated at time xx:55 of the previous hour into the new collector file. Thus, at time xx:00 the collector file already contains a list of active processes 502 for time xx:55 of the previous hour. Therefore, at time xx:55 of the current hour, the collector file contains thirteen lists 502, twelve response time entries 516, and twelve lists 528.

Figure 6:
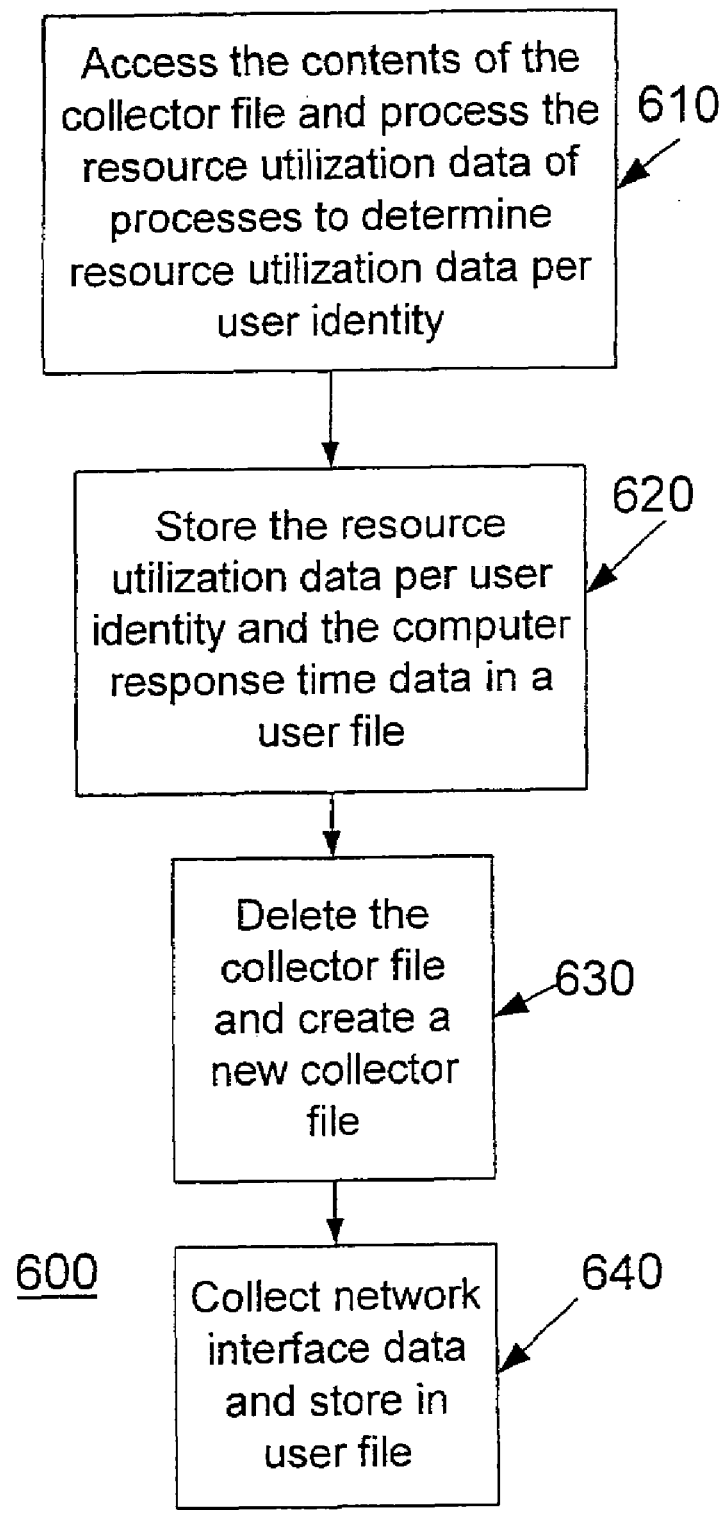
FIG. 6 is a flow diagram of a process implemented by processing a processor script.
Figure 7:
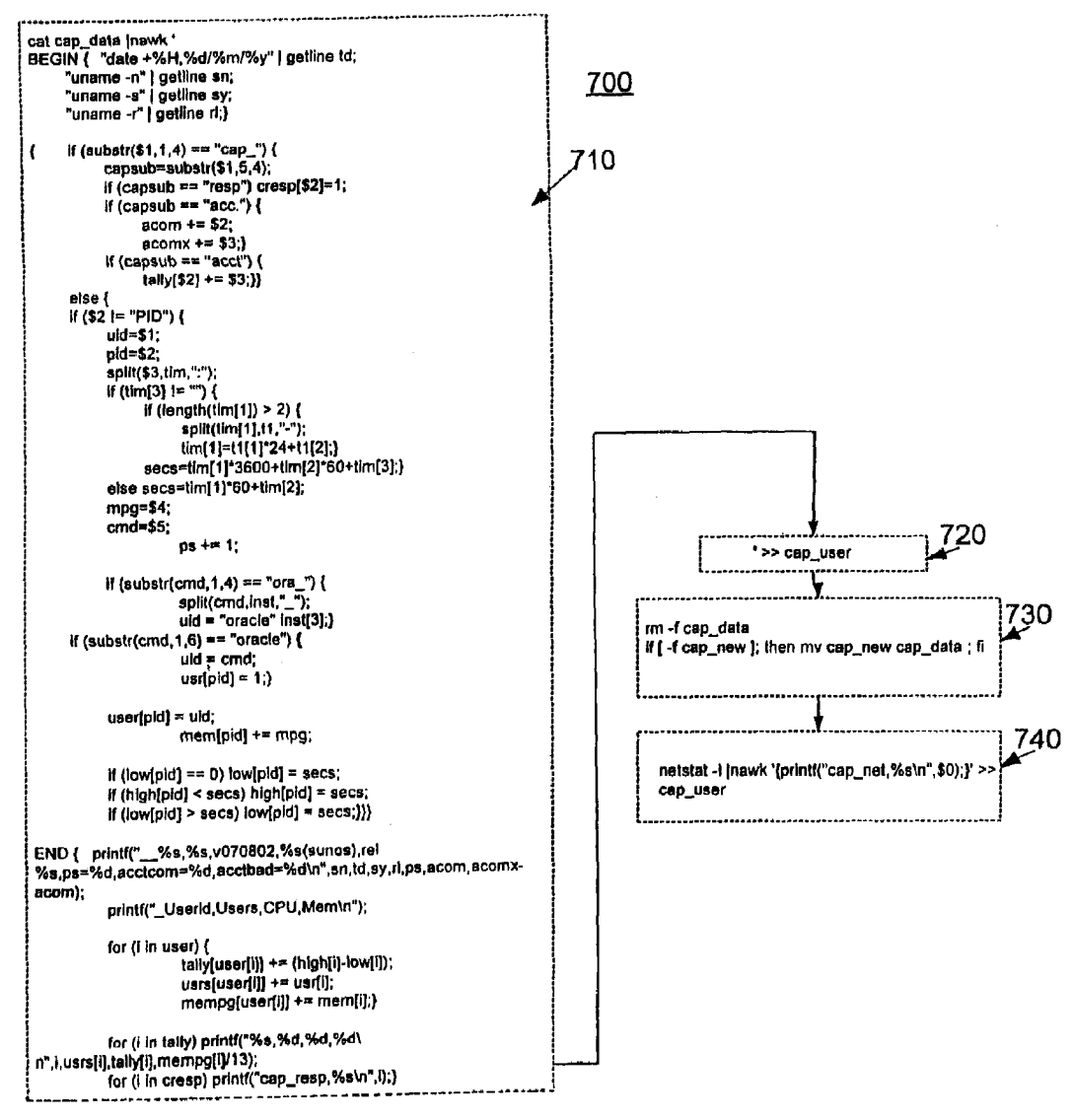

Referring to FIG. 6, a process 600 implemented by processing the processor script includes accessing the contents of the collector file and processing the resource utilization data of processes to determine the resource utilization data per user identity (610). The resource utilization data per user identity and the computer response time data then are stored in a user file (620), the collector file is deleted and a new collector file is created (630), and network interface data is collected and stored in the user file (640). FIG. 7 shows corresponding Sun UNIX code segments 700 used to perform each operation in the process 600. Code segments 710, 720, 730, and 740 correspond to operations 610, 620, 630, and 640, respectively. FIG. 8 shows contents 800 of the user file resulting from processing the processor script one time. The ellipses 801 are used to indicate that user identity entries have been omitted to decrease the size of the contents of the file for illustrative purposes.

The resource utilization data per user identity is determined by performing calculations on the resource utilization data per process stored in the collector file (i.e., the thirteen lists 502) (610, 710). The calculations for CPU use, memory use, and number of active database sessions in the last hour (i.e., from time 'xx-1':55 to time xx:55) are performed in an analogous manner as that described with respect to operation 264 above. The resulting resource utilization data per user identity is shown in list 802.

List 802 includes user identity entries. Exemplary user identity entry 804 includes a user identity 806, an estimate of the number of active sessions 808 (always zero for user identities that do not correspond to databases), an estimate of the total amount of CPU seconds that all of the processes (active and transient) launched by that user identity have used in the last hour 810, and an estimate of the average amount of memory Kbytes held by that user identity 812. According to entry 804, the user identity "oracleNfwU" is a database user identity that has had three active sessions in the past hour, has used 2 CPU seconds, and has held an average of 758,345 Kbytes of memory.

The memory data collected in this implementation does not correspond to physical memory. Rather, it corresponds to a combination of physical and virtual memory. As such, the memory data is not easily linked to available physical memory and is useful mainly as an indicator of relative memory consumption between different user identities (and ultimately between applications).

The calculated resource utilization data per user identity and the resource response time data collected from the process script are stored in the user file named "cap_user" (620, 720). The resource utilization data is list 802 and the response time data is list 814 shown in FIG. 8. Twelve response time entries make up list 814. Each response time entry 816 is an exact copy of each of the twelve response time entries 516 stored in the collector file.

The collector file "cap_data" is deleted and a new collector file is created by renaming the "cap_new" data file (630, 730). Thus, the newly created collector file contains the resource utilization statistics of processes 502 of time (xx:55).

Network interface data 818 is collected and stored in the user file (640, 740). The data includes the names of all network interfaces to the UNIX server 820, their corresponding maximum packet size 822, their network/address names 824, and various interface counters 826.

Figure 9:
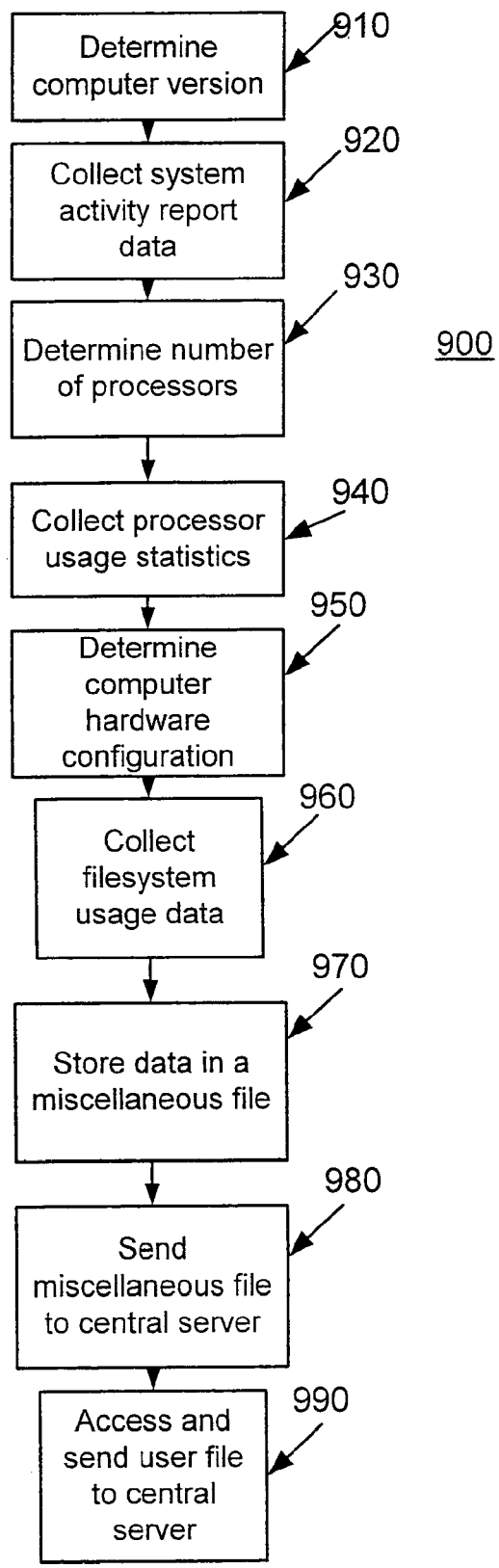
FIG. 9 is a flow diagram of a process implemented by processing a transfer script.
Figure 10:
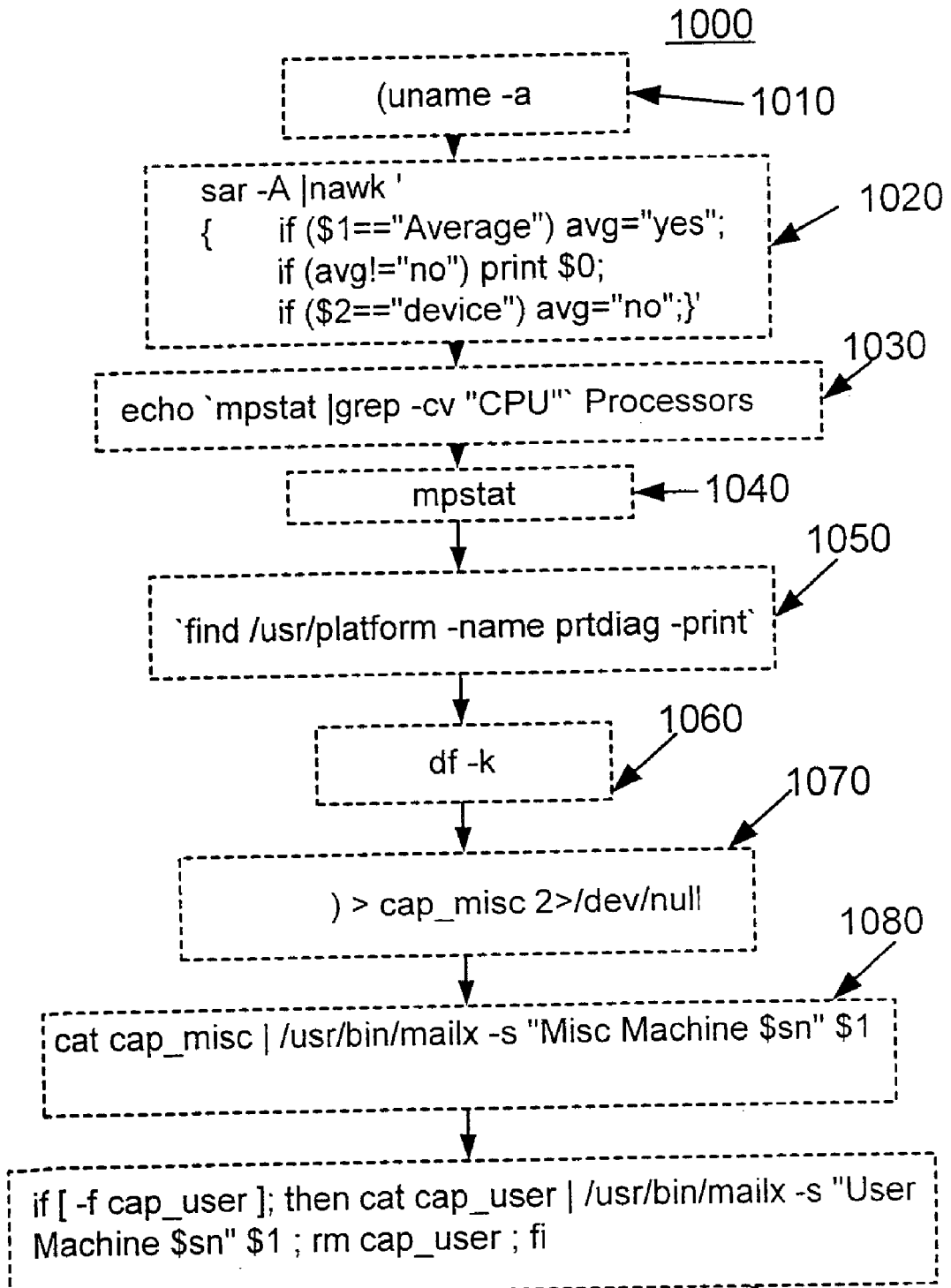
FIG. 10 shows exemplary UNIX code segments that may be used to perform the operations in the process in FIG. 9

Referring to FIG. 9, a process 900 implemented by processing the transfer script includes determining the computer version (910), collecting system activity report data (920), determining the number of processors (930), collecting processor usage statistics (940), determining computer hardware configuration (950), collecting file system usage data (960), storing data in a miscellaneous file (970), sending the miscellaneous file to the central server (980), and accessing and sending the user file to the central server (990). FIG. 10 shows the corresponding Sun UNIX code segments 1000 used to perform each operation in the process 900. Code segments 1010, 1020, 1030, 1040, 1050, 1060, 1070, 1080, and 1090 correspond to operations 910, 920, 930, 940, 950, 960, 970, 980, and 990, respectively. FIG. 11 shows a system activity report portion 1100 of the contents of the miscellaneous file, and FIG. 12 shows the rest of the contents of the miscellaneous file 1200. The ellipses 1101 and 1201 are used to indicate that data entries have been omitted to decrease the size of the contents of the file for illustrative purposes.

The computer version is determined (910, 1010) and is shown as entry 1102 in FIG. 11. The computer version entry 1102 includes the UNIX version run on the computer 1104 (e.g., SunOS), the name of the computer 1106 (e.g., se395), and the release number of the operating system 1108 (e.g., release 5.7).

The system activity report data is collected (920, 1020) by accessing the files containing the system activity report data collected by the computer each ten minutes of the day. Some of the collected system activity report data is shown in FIG. 11. Specifically, FIG. 11 shows computer-level CPU utilization data 1110, data 1112 related to the number of processes in a process queue waiting to be executed, and data 1114 related to the number of memory swaps performed by the computer. The data includes an average daily estimate for each parameter.

The number of processors and processor usage statistics are determined (930, 1030 and 940, 1040, respectively). The number of processors may be used to calculate CPU percent utilization figures for the computer.

Hardware configuration data and file system usage data are determined (950, 1050 and 960, 1060, respectively). The hardware configuration data of the computer includes CPU-related hardware data, memory-related hardware data, and I/O card-related hardware data.

The collected data is stored in the miscellaneous file (970, 1070). The contents of the miscellaneous file include contents 1100 (FIG. 11) and contents 1200 (FIG. 12). Referring to FIG. 12, the miscellaneous file contents 1200 include the number of processors 1202, processor usage statistics 1204, hardware configuration data 1206, and file system usage data 1208. The hardware configuration data includes CPU-related hardware data 1210, memory-related hardware data 1212, and I/O card-related hardware data 1214.

The miscellaneous file is sent to the central server (980, 1080) using e-mail. The subject header of the e-mail is "Misc Computer x", where "x" is the computer name. The user file is then accessed and also sent to the central server (990, 1090) in a separate e-mail. If no user file exists, then no e-mail is sent. If a user file does exist, the e-mail is sent and the e-mail subject header is "User Computer x", where "x" is the computer name.

The computer 110 processes the transfer script and sends to the central server the miscellaneous file and the user file shortly after 23:59. The central server, therefore, typically receives these files within a half hour, depending on the e-mail transit time.

The central server 130 may receive e-mails from multiple computers 110. If all the computers 110 sending e-mails to the central server 130 are located in the same time zone as the central server, then the central server should receive all of the computer e-mails by 00:30 (assuming all computers process the transfer script at 23:59). The central server reads the emails every hour and places them into a temporary holding file for each computer.

After receiving the e-mails from each computer and after placing all of the e-mails into temporary holding files, the central server 130 processes a report data script. The central server 130 may be programmed to process the report data script automatically by adding an entry to a crontab of the central server 130 that, for example, invokes the report data script at 01:00 every day. The central server 130 may divide the computers 110 into groups based on their time zone region and process the report data script at different times during the day for each group of computers within the same time zone. For example, a central server in New York may group computers in New York and Washington, DC into one time zone region group and group computers in California into another. If all computers 110 send e-mails shortly after 23:59 their time, then the central server may invoke the report data script at 01:00 each day to process the e-mails from the computers in New York and Washington, DC, and may invoke the report data script again at 04:00 each day to process the e-mails from the computers in California. Multiple entries in the crontab on the central server 130 may be used to invoke the report data script at the specified times.

Figure 13:
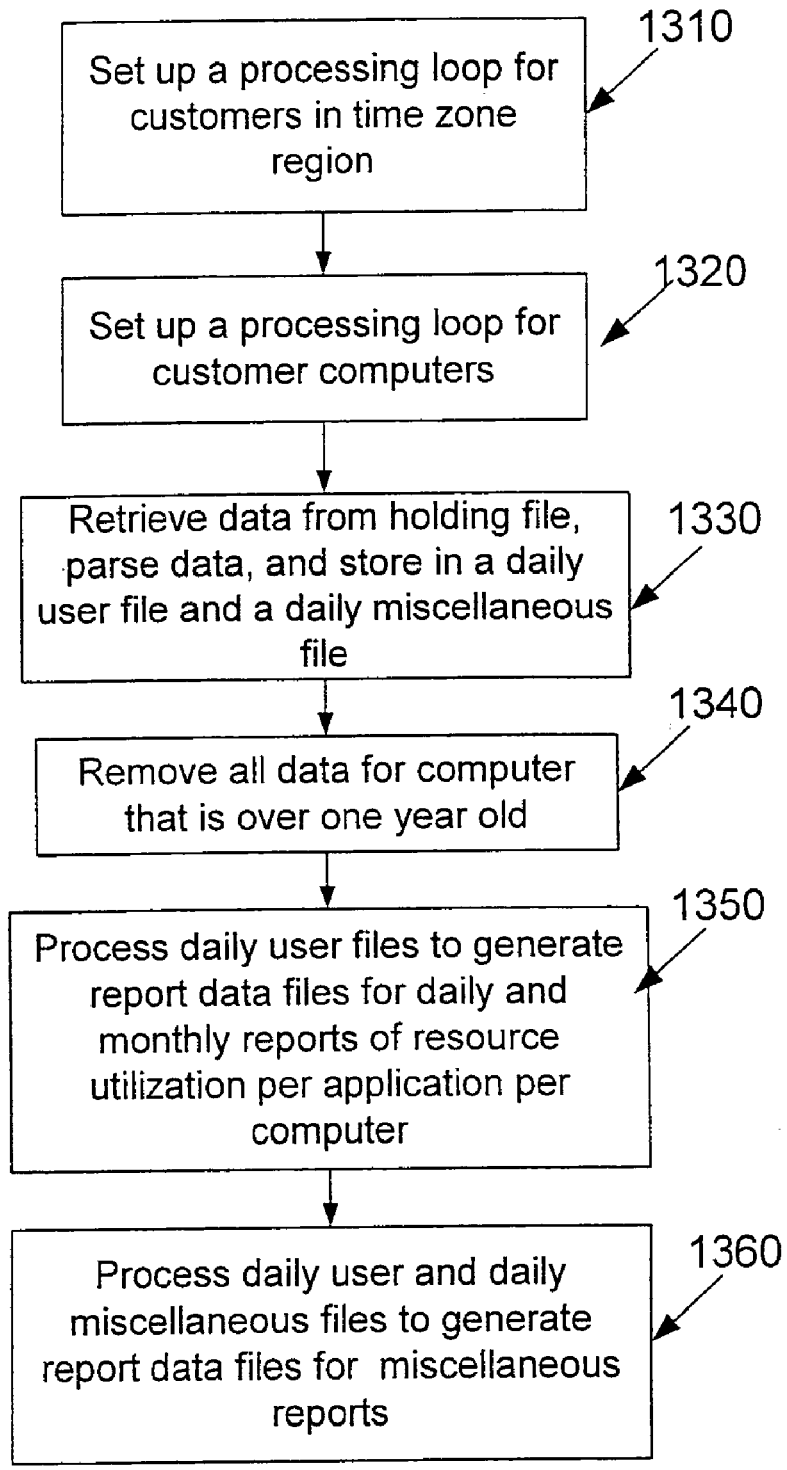
FIG. 13 is a flow diagram of a process implemented by processing a report data script.
Figure 14:
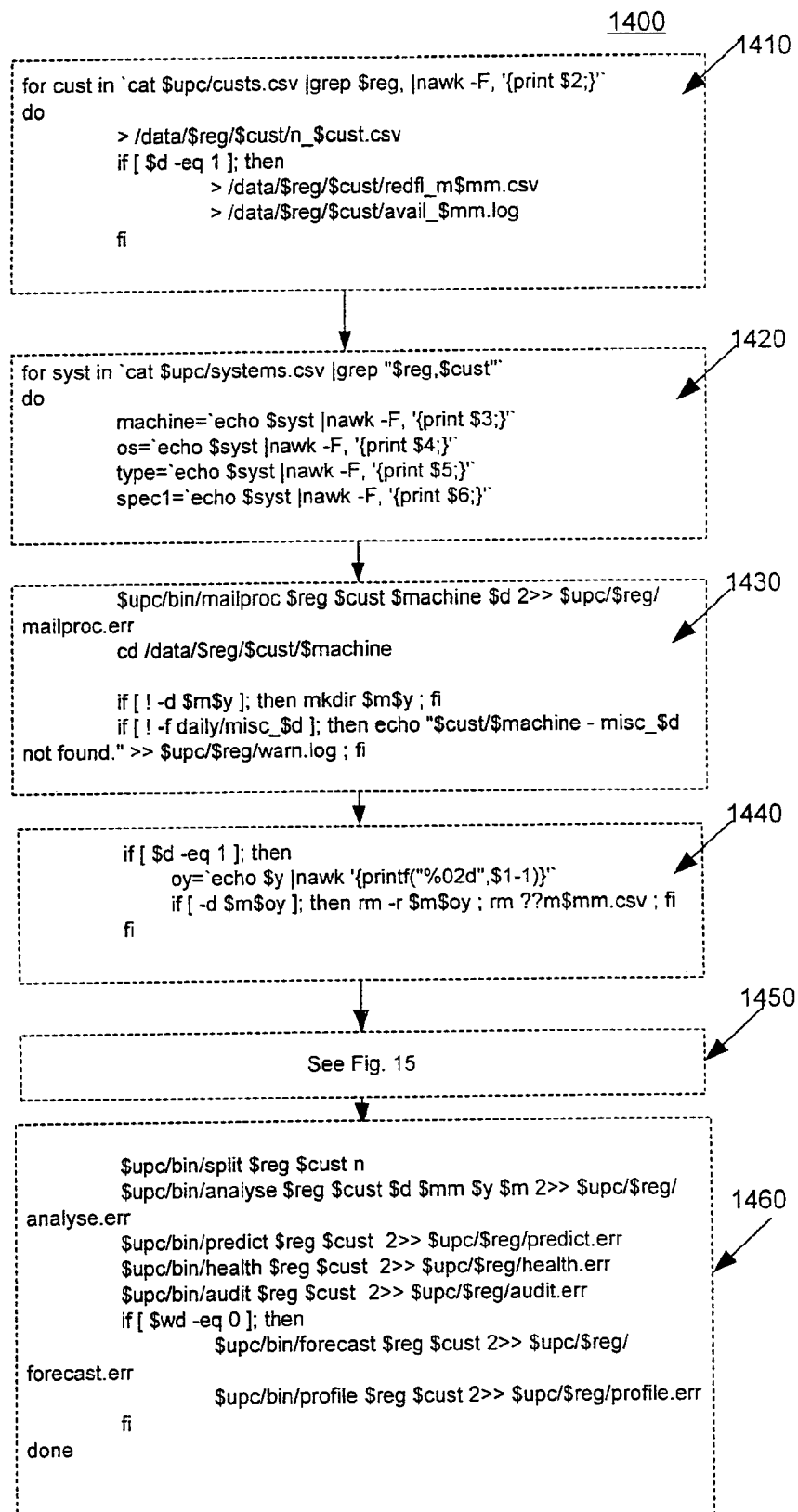

Referring to FIG. 13, a process 1300 implemented by processing the report data script includes setting up a process loop for customers in a region (1310), setting up a process loop for customer computers (1320), retrieving data from the temporary holding file, parsing the data, and storing it in a daily user file and a daily miscellaneous file (1330), removing all data for the computer that is over one year old (done only on the first day of each month) (1340), processing the user files to generate report data files for daily and monthly reports of resource utilization per application per computer (1350), and processing the user and miscellaneous files to generate report data files for miscellaneous reports (1360). FIGS. 14 and 15 show the corresponding Sun UNIX code segments 1400 used to perform the operations in the process 1300. Code segments 1410, 1420, 1430, 1440, 1450, and 1460 correspond to operations 1310, 1320, 1330, 1340, 1350, and 1360, respectively.

A processing loop is set up for each customer that is identified as being located in the time zone region for which the script has been invoked (1310, 1410). For example, if the report data script was invoked at 04:00, then a processing loop will occur for each customer identified as being in the same time zone region as California. A file named "custs.csv" contains a list of customers and the geographic region in which they are located and is used to identify those customers in the same time zone region.

A processing loop is set up for each customer computer (1320, 1420). The file "systems.csv" is accessed to determine the computers associated with each customer. The subsequent process steps 1330 to 1360, therefore, process the computer data sent by each of the computers of the customers within the same time zone region group and automatically generate corresponding report data files for each of the computers.

The computer data is retrieved from the e-mail in the temporary holding file for the identified customer computer and is parsed and subsequently stored in a user file and a miscellaneous file (1330, 1430). A script named "mailproc" is invoked to extract the data from the e-mails, verify the integrity of the data, and parse the data into a daily user file and a daily miscellaneous file. The daily user file and the daily miscellaneous file contain the same contents as the user file and the miscellaneous file generated by the computer 110. Daily user files and daily miscellaneous files are typically stored for one month and then deleted.

Any data stored for the computer that is over one year old is deleted (1340,1440). The main purpose of deleting this old data is to conserve disk space.

Figure 16:
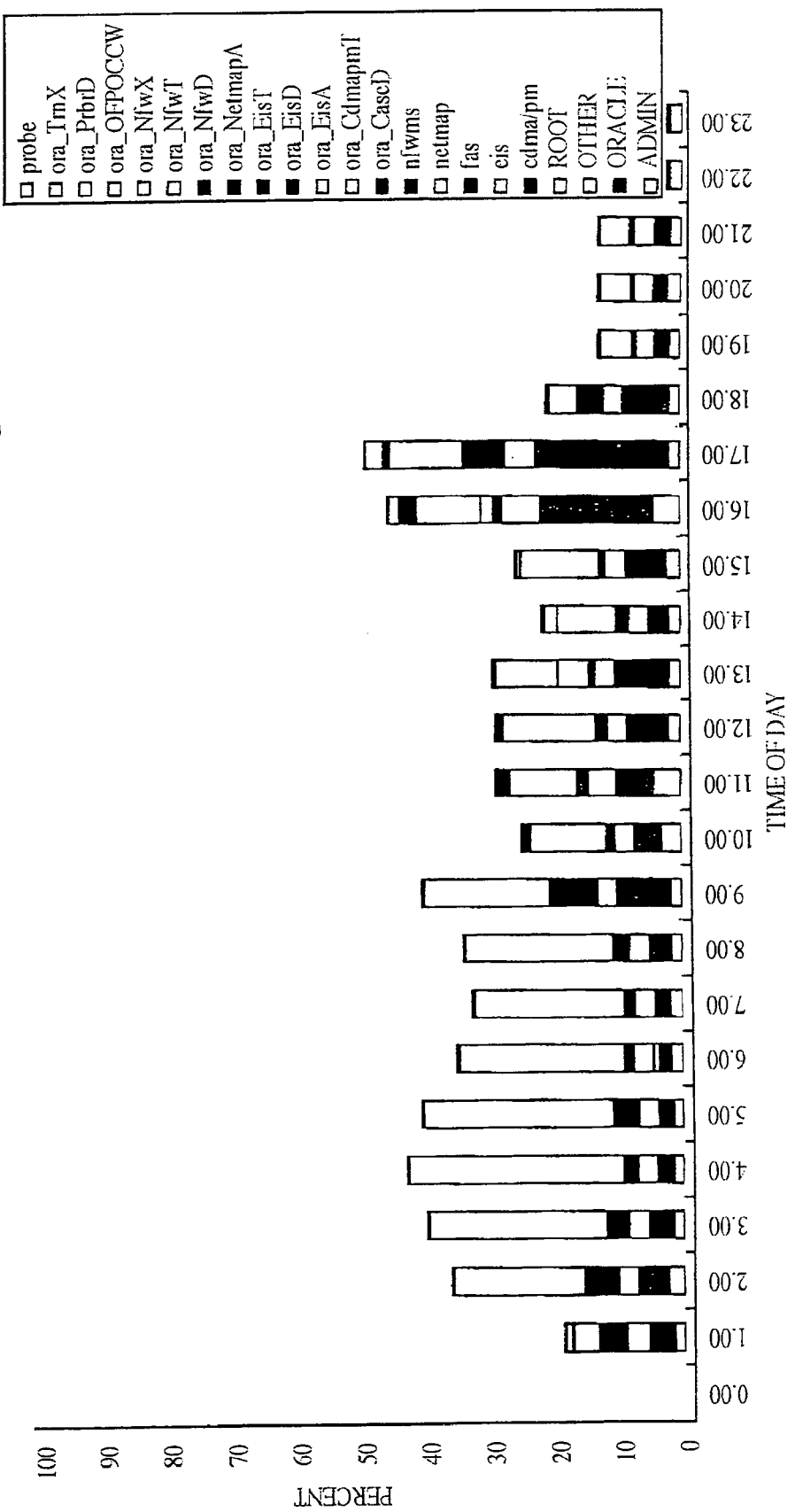
FIG. 16 is a graph of day-by-hour CPU usage by application.

The daily user files are then processed to generate report data files for daily and monthly reports of resource utilization per application per computer (1350,1450). For example, a daily CPU usage by application report data file named "acdzz," where zz is the day of the month, may be created. This report data file may be used to create reports that contain graphs similar to that shown in FIG. 16. The hourly CPU utilization of each application in the user files is shown as a percent of the total CPU capacity of the computer. This is accomplished by mapping user identities to applications, adding up the hourly CPU time used by each of the user identities of the application, and dividing that number by the total CPU time available to the computer in that hour. For example, an application associated with two user identities, each of which used 36 seconds of CPU time in the hour, used approximately 1% of the CPU capacity of a computer 210 with two CPUs (i.e., 72 seconds/[2×3600 seconds]=0.01).

Figure 17:
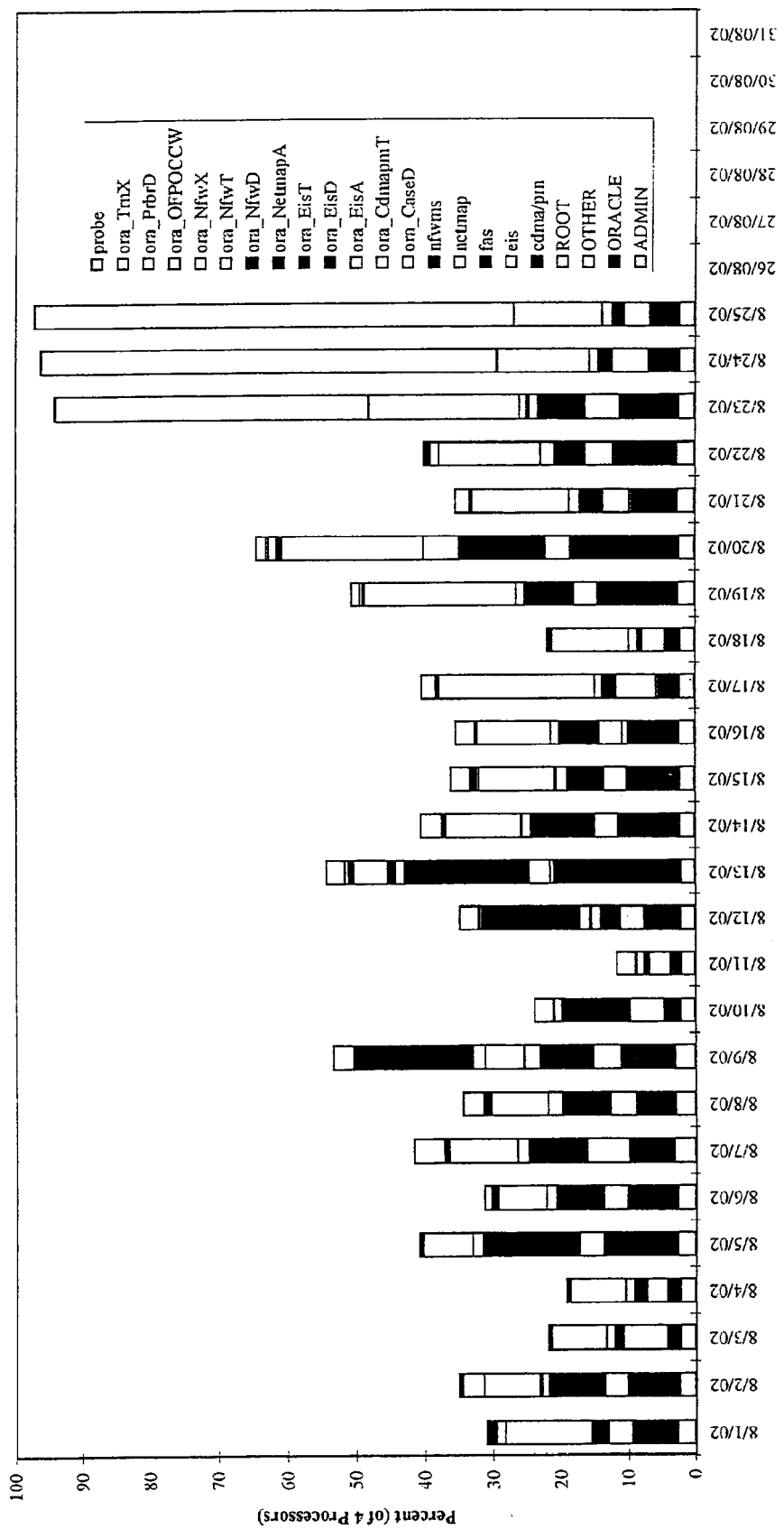
FIG. 17 is a graph of month-by-day CPU usage by application.

A monthly CPU usage by application report data file may also be created and named "acmyy," where yy is the month. This report data file may be used to create reports that contain graphs similar to that shown in FIG. 17. The CPU utilization for each application for each day of the month may be determined by adding up the hourly CPU time used by each application and then dividing that total by the daily CPU time available to the computer 110. Every time the report data script is processed a new daily data entry is added to the "acmyy" file.

Figure 18:
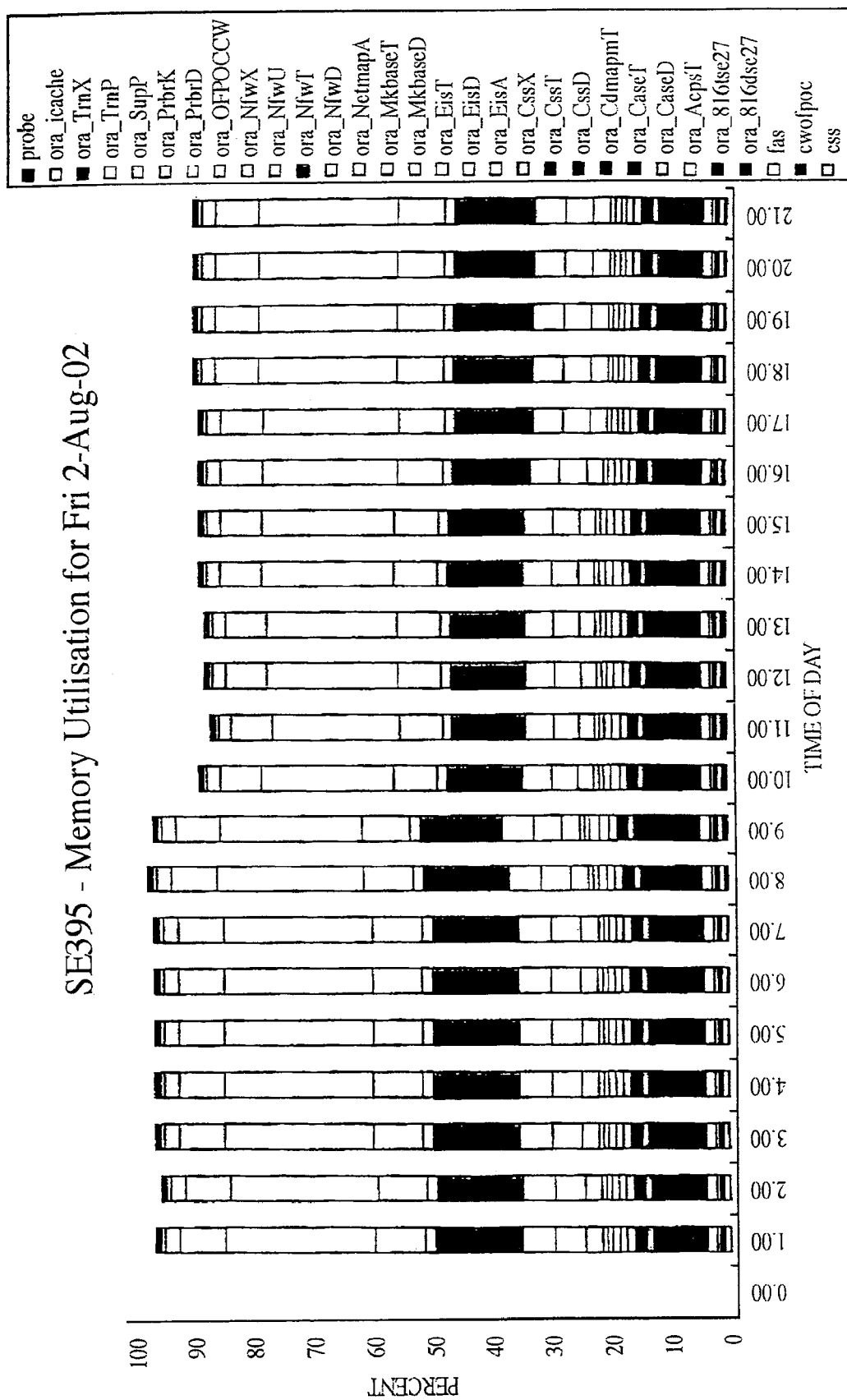
FIG. 18 is a graph of day-by-hour memory usage by application.
Figure 19:
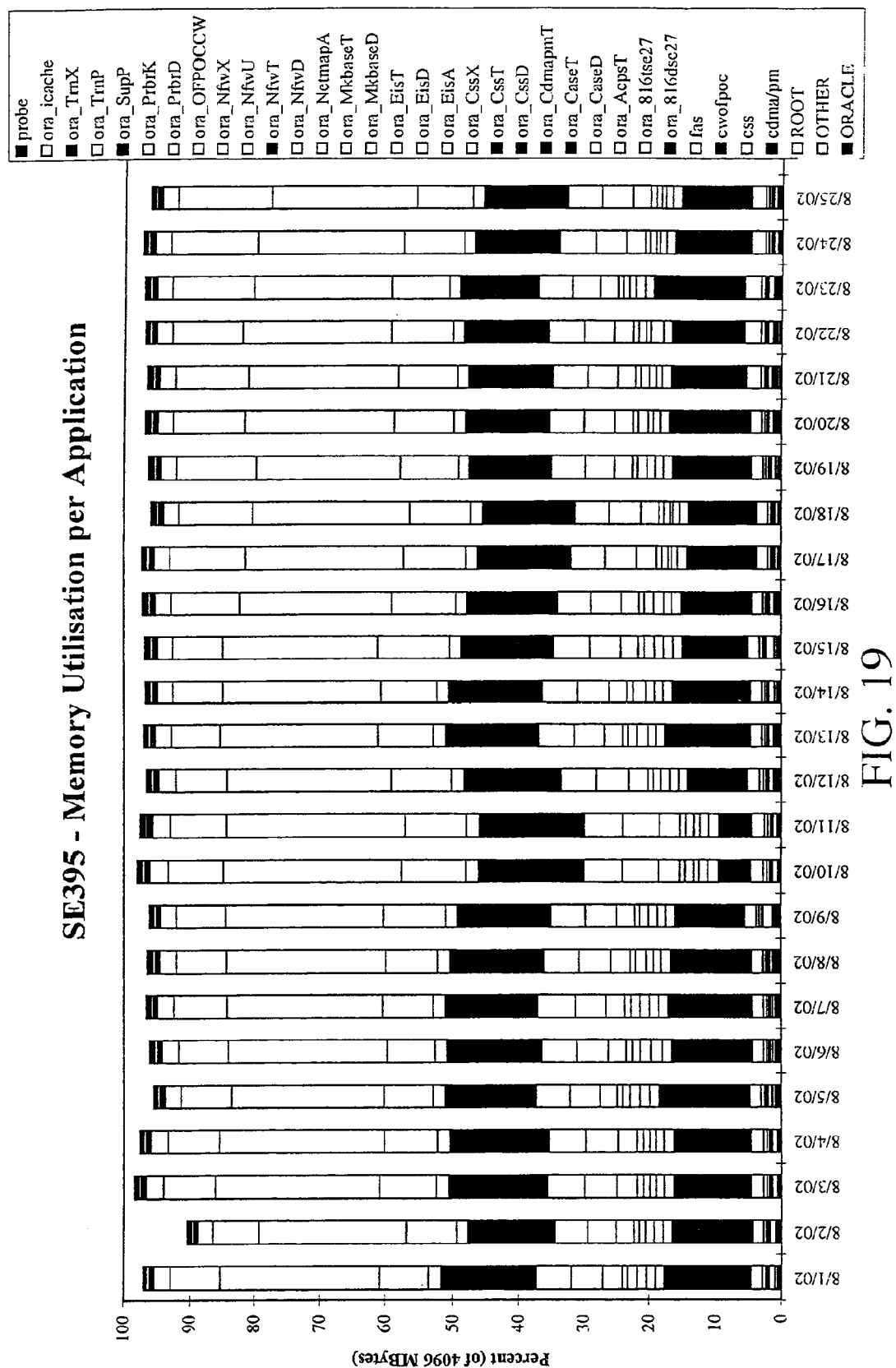
FIG. 19 is a graph of month-by-day CPU usage by application.
Figure 20:
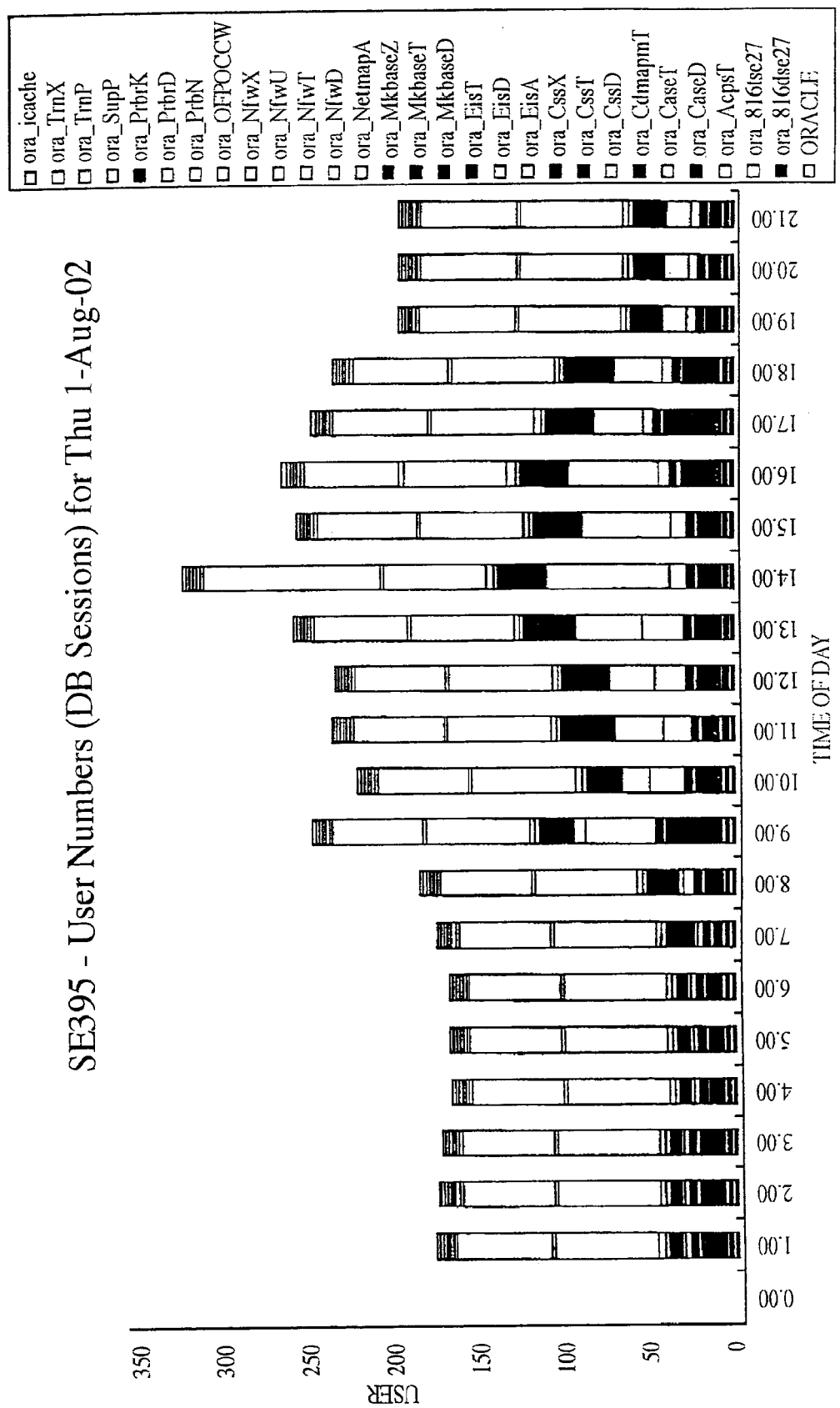
FIG. 20 is a graph of day-by-hour database sessions per database application.
Figure 21:
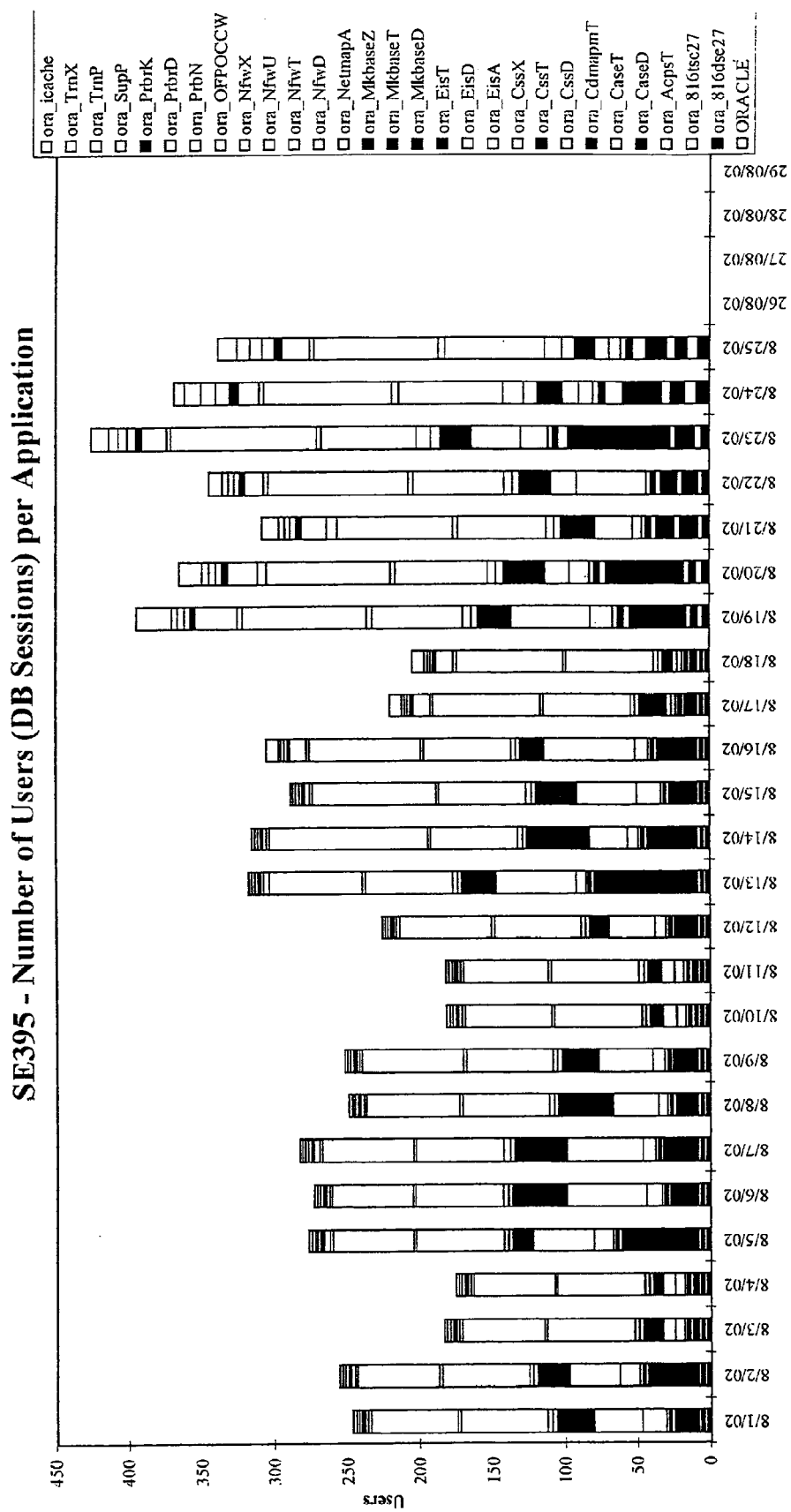
FIG. 21 is a graph of month-by-day database sessions per database application.
Figure 22:
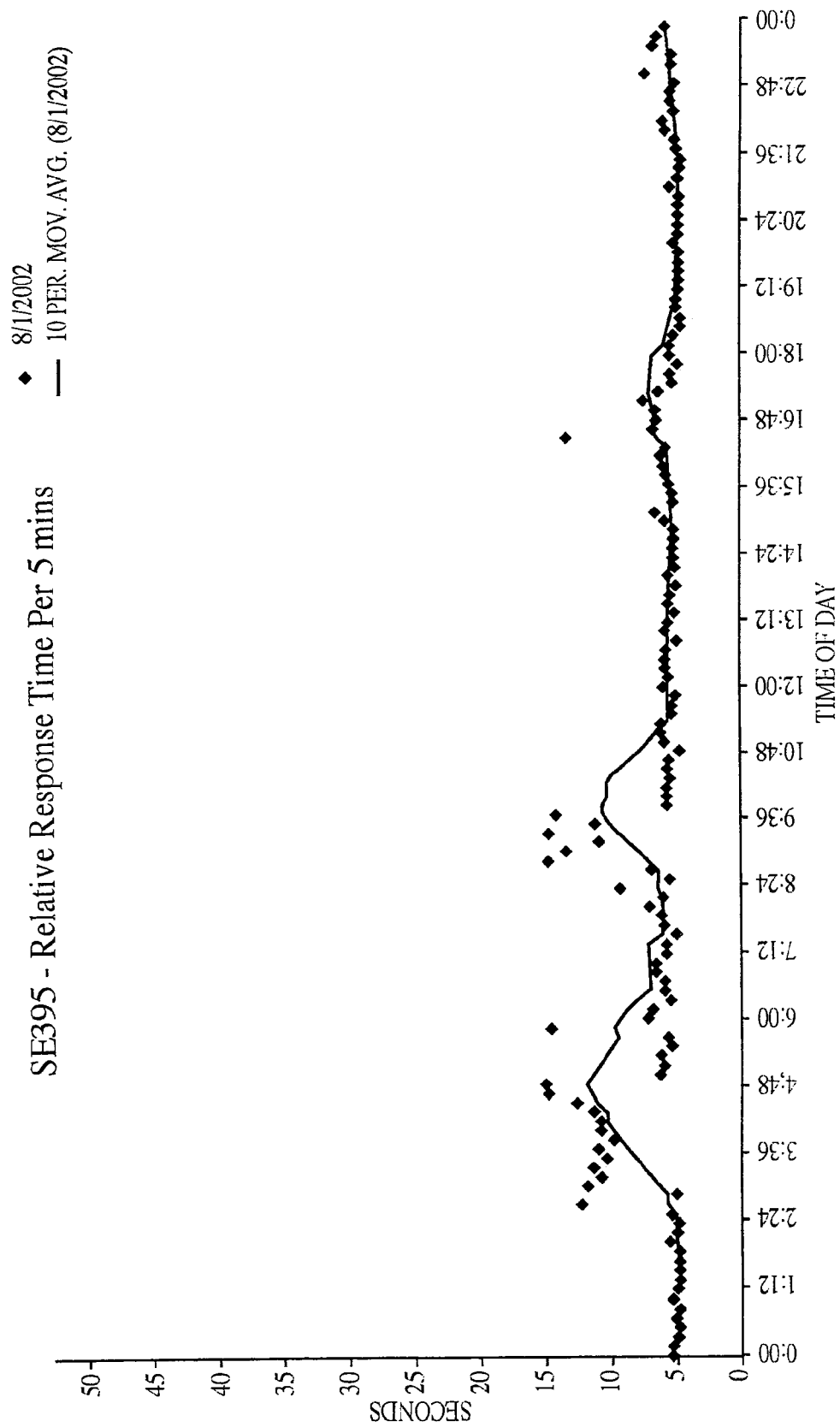
FIG. 22 is a graph of day-by-hour computer response time.
Figure 23:
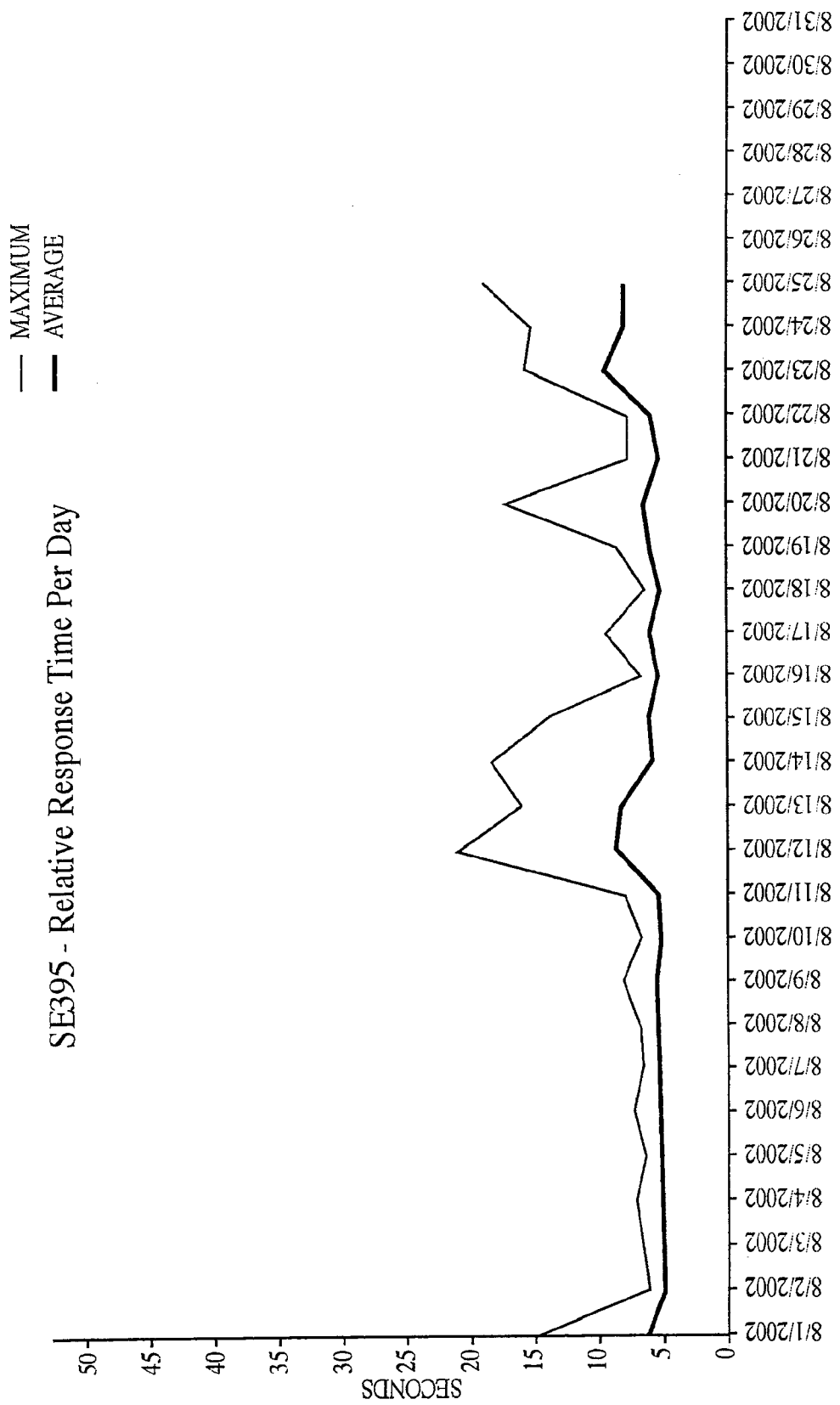
FIG. 23 is a graph of month-by-day computer response time.
Figure 25A:
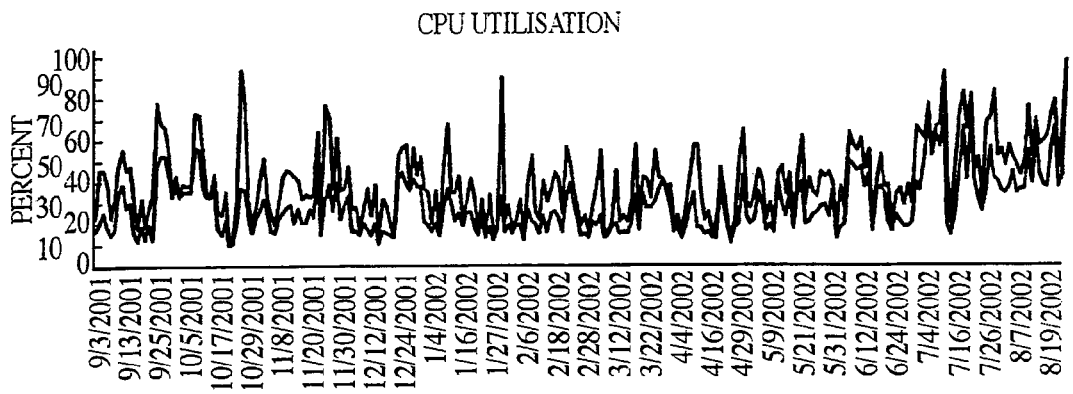
FIGS. 25*a*, 25*b*, 25*c*, 25*d*, 25*e*, and 25*f* show year-by-day computer capacity graphs.
Figure 25B:
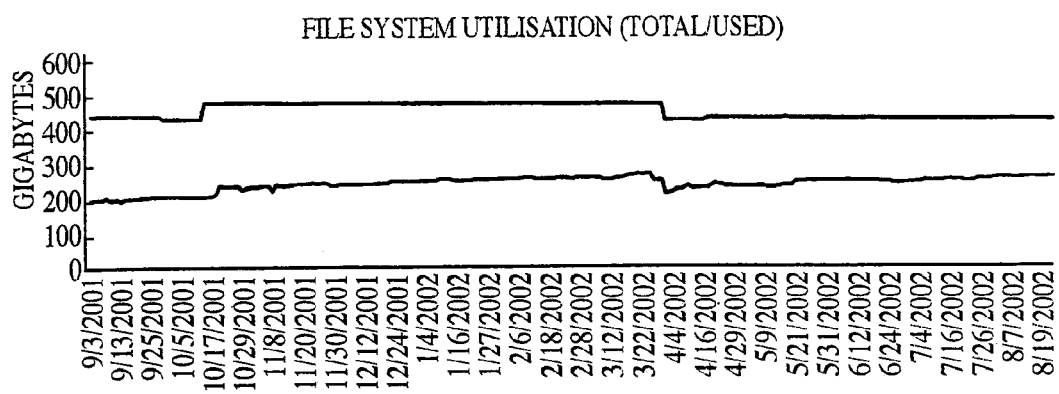
Figure 25C:
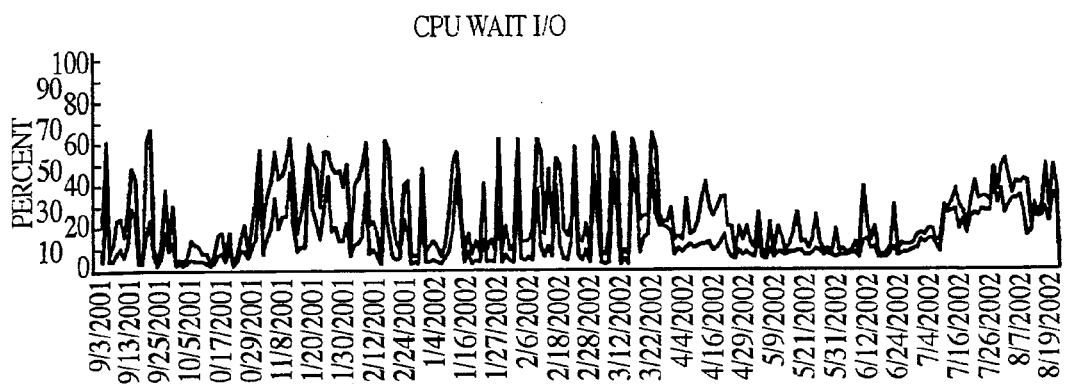
Figure 25D:
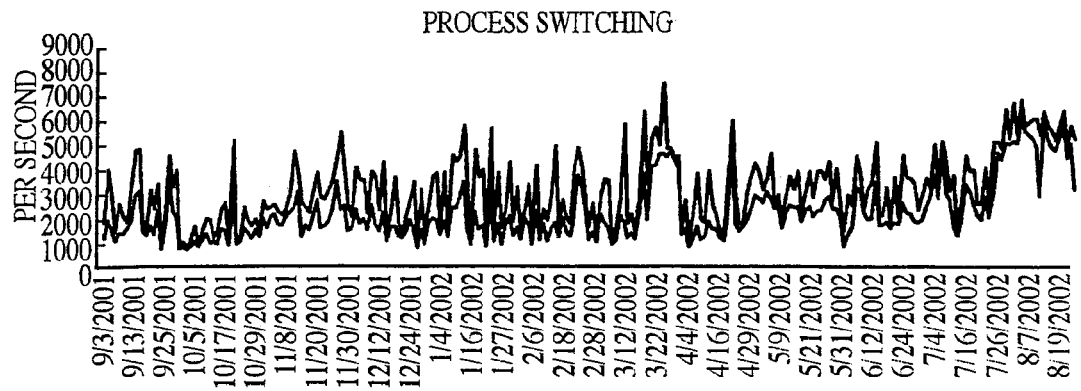
Figure 25E:
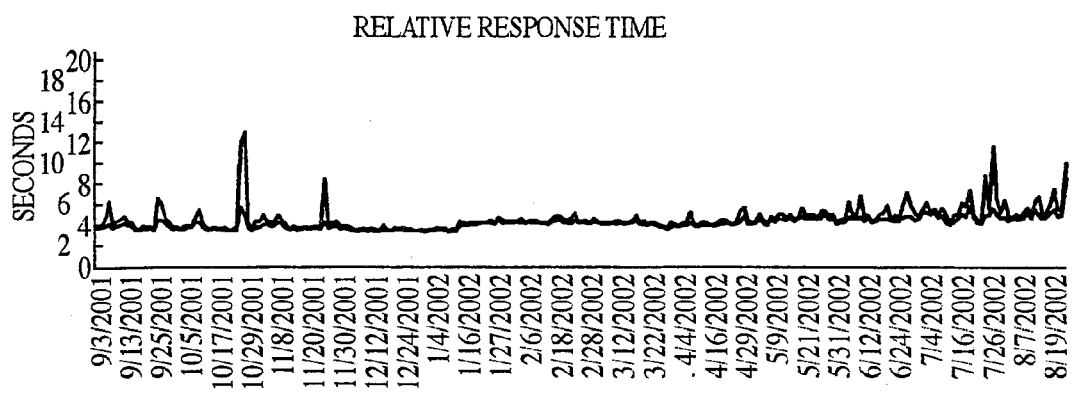
Figure 25F:
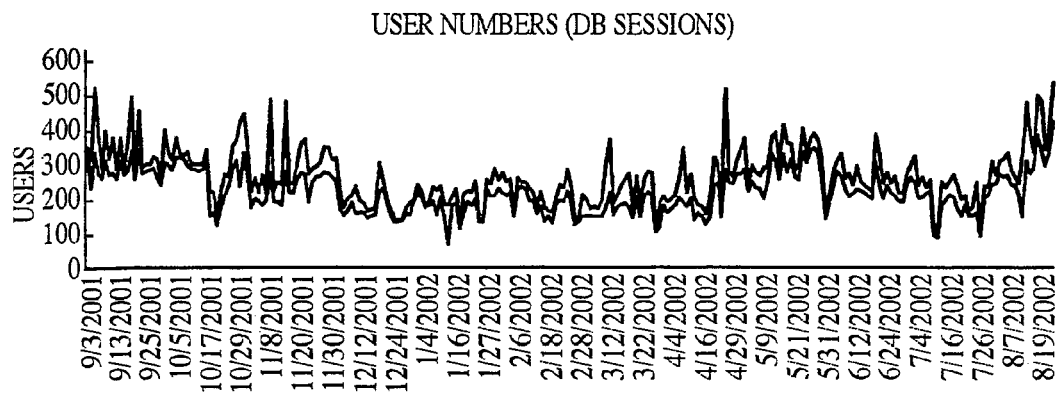

Daily and monthly memory usage by application report data files may also be created and may be named "amdzz" and "ammyy", respectively. These data files may be used to create reports that contain graphs similar to those shown in FIGS. 18 and 19. Similarly, daily and monthly number of database sessions per database application report data files may be created and may be named "atdzz" and "atmyy", respectively. These data files may be used to create reports that contain graphs similar to those shown in FIGS. 20 and 21. Finally, daily and monthly computer response time report data files may be created and may be named "rtdzz" and "rtmyy", respectively. These data files may be used to create reports similar to those shown in FIGS. 22 and 23.

Both the daily user and daily miscellaneous files may be processed to generate report data files for various other kinds of reports (1360,1460). For example, a script named "health" may be invoked to create a report data file that is used to generate a computer health report. FIG. 24 shows an example of a health report that may be generated. A script named "predict" and a script named "forecast" may be used to create report data files for capacity forecast reports.

The report data files are accessible to the desktop computer 140, which may use them to generate various reports using a desktop publishing software program. Reports may be generated that include year-by-day graphs created from the daily and monthly report data files. Examples of such yearly graphs are shown in FIGS. 25a, 25b, 25c, 25d, 25e, and 25f.

A number of implementations have been described. Nevertheless, it will be understood that various modifications may be made. Accordingly, other implementations are within the scope of the following claims.

What is claimed is:

1. A computer-implemented method of reporting computer resource utilization per computer application, the method comprising:
    processing a collector script during first predetermined time intervals, the processing of the collector script including collecting resource utilization data for processes currently running on a computer, the processes corresponding to one or more computer applications;
    processing a processor script during second predetermined time intervals, the processing of the processor script including determining resource utilization data for the one or more computer applications by:
        identifying a first process corresponding to a particular computer application,
        identifying a second process corresponding to the particular computer application, the second process being different from the first process,
        accessing first resource utilization data for the first process,
        accessing second resource utilization data for the second process, and
        determining resource utilization data for the particular computer application by combining the first resource utilization data with the second resource utilization data;
    generating reports of resource utilization data for the one or more computer applications including the particular computer application by accessing and performing calculations on the resource utilization data for the particular computer application; and
    presenting the reports of resource utilization data for the one or more computer applications including the particular computer application.

2. The method of claim 1 wherein the processes comprise portions of the particular computer application that are being executed by the computer at the time the collector script is processed.

3. The method of claim 1 wherein determining resource utilization data for the particular computer application includes mathematically combining the first resource utilization data with the second resource utilization data.

4. The method of claim 3 wherein the first resource utilization data comprises a first total CPU time used by the first process and the second resource utilization data comprises a second total CPU time used by the second process.

5. The method of claim 4 wherein determining resource utilization data for the particular computer application includes determining a total CPU time for the particular computer application by adding the first total CPU time to the second total CPU time.

6. The method of claim 3 wherein the first resource utilization data comprises a first amount of memory held for the first process and the second resource utilization data comprises a second amount of memory held for the second process.

7. The method of claim 6 wherein determining resource utilization data for the particular computer application includes determining a total amount of memory held for the particular computer application by adding the first amount of memory to the second amount of memory.

8. The method of claim 3 wherein the first resource utilization data comprises a first number of active database sessions used by the first process and the second resource utilization data comprises a second number of active database sessions used by the second process.

9. The method of claim 8 wherein determining resource utilization data for the particular computer application includes determining a total number of active database sessions used by the particular computer application by adding the first number of active database sessions to the second number of active database sessions.

10. The method of claim 1 further comprising processing a transfer script during third predetermined time intervals, the transfer script sending the resource utilization data for one or more computer applications to a central server.

11. The method of claim 10 wherein generating reports includes accessing resource utilization data stored in the central server.

12. The method of claim 10 wherein sending the resource utilization data for one or more computer applications to the central server comprises sending an ASCII file.

13. The method of claim 10 wherein sending the resource utilization data for one or more computer applications to the central server comprises sending an e-mail.

14. The method of claim 10 wherein the first predetermined time intervals are shorter than the second predetermined time intervals which are shorter than the third predetermined time intervals.

15. The method of claim 14 wherein the second predetermined time intervals are integer multiples of the first predetermined time intervals and the third predetermined time intervals are integer multiples of the second predetermined time intervals.

16. The method of claim 1 wherein the computer applications comprise unix-based computer applications.

17. The method of claim 1 wherein the first predetermined time intervals are shorter in duration than the second predetermined time intervals.

18. The method of claim 1 wherein the resource utilization data of processes includes central processing unit utilization data and memory utilization data for each process.

19. The method of claim 1 wherein the collector script also collects computer response time data.

20. The method of claim 18 wherein the computer response time data is collected by the collector script by invoking a response time script that calculates the amount of time required to execute a predetermined code segment.

21. A system for reporting computer resource utilization per computer application, the system comprising:
    a first computer configured to:
        process a collector script during first predetermined time intervals, the processing of the collector script including collecting resource utilization data for processes currently running on the first computer, the processes corresponding to one or more computer applications;
        process a processor script during second predetermined time intervals, the processing of the processor script including determining resource utilization data for the one or more computer applications by:
            identifying a first process corresponding to a particular computer application,
            identifying a second process corresponding to the particular computer application, the second process being different from the first process,
            accessing first resource utilization data for the first process,
            accessing second resource utilization data for the second process, and
            determining resource utilization data for the particular computer application by combining the first resource utilization data with the second resource utilization data; and
    a second computer configured to:
        access the resource utilization data for the one or more computer applications including the resource utilization data for the particular computer application,
        generate reports of resource utilization data for the one or more computer applications including the particular computer application by accessing and performing calculations on the resource utilization data for the particular computer application; and
        present reports of resource utilization data for the one or more computer applications, including the particular computer application.

22. The system of claim 21, wherein the first computer and the second computer are distinct computers.

23. An apparatus for reporting computer resource utilization per computer application, the apparatus comprising:
    means for processing a collector script during first predetermined time intervals, the processing of the collector script including collecting resource utilization data for processes currently running on a computer, the processes corresponding to one or more computer applications;
    means for processing a processor script during second predetermined time intervals, the processing of the processor script including determining resource utilization data for the one or more computer applications and the determining resource utilization data for the one or more computer applications including:
        identifying a first process corresponding to a particular computer application,
        identifying a second process corresponding to the particular computer application, the second process being different from the first process,
        accessing first resource utilization data for the first process,
        accessing second resource utilization data for the second process,
        determining resource utilization data for the particular computer application by combining the first resource utilization data with the second resource utilization data;
    means for generating reports of resource utilization data for the one or more computer applications including the particular computer application by accessing and performing calculations on the resource utilization data for the particular computer application; and
    means for presenting reports of resource utilization data for the one or more computer applications including the particular computer application.

\* \* \* \* \*

UNITED STATES PATENT AND TRADEMARK OFFICE
CERTIFICATE OF CORRECTION

PATENT NO. : 7,469,285 B2  Page 1 of 1
APPLICATION NO. : 11/757209
DATED : December 23, 2008
INVENTOR(S) : Peter M. W. Poortman It is certified that error appears in the above-identified patent and that said Letters Patent is hereby corrected as shown below:

On Title Page, Column 1, delete "Aukland (NZ)" and insert -- Auckland (NZ) --.

On Title Page, Column 1, insert

-- Related U.S. Application Data

Continuation of application No. 10/259,786, filed September 30, 2002, now Pat. No. 7,243,145. --.

Signed and Sealed this

Second Day of June, 2009

JOHN DOLL
*Acting Director of the United States Patent and Trademark Office*